United States Patent
Chen et al.

(10) Patent No.: US 10,134,107 B2
(45) Date of Patent: *Nov. 20, 2018

(54) METHOD AND APPARATUS FOR ARRANGING PIXELS OF PICTURE IN STORAGE UNITS EACH HAVING STORAGE SIZE NOT DIVISIBLE BY PIXEL SIZE

(71) Applicant: MEDIATEK INC., Hsin-Chu (TW)

(72) Inventors: Chun-Chia Chen, Hsinchu (TW); Chi-Cheng Ju, Hsinchu (TW); Yung-Chang Chang, New Taipei (TW); Ping Chao, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 488 days.

This patent is subject to a terminal disclaimer.

(21) Appl. No.: 14/226,840

(22) Filed: Mar. 27, 2014

(65) Prior Publication Data
US 2014/0294090 A1    Oct. 2, 2014

Related U.S. Application Data

(60) Provisional application No. 61/806,591, filed on Mar. 29, 2013, provisional application No. 61/900,633, filed on Nov. 6, 2013.

(51) Int. Cl.
*G06T 1/60* (2006.01)
*H04N 19/51* (2014.01)
(Continued)

(52) U.S. Cl.
CPC ............... *G06T 1/60* (2013.01); *G06T 7/408* (2013.01); *H04N 19/433* (2014.11); *H04N 19/51* (2014.11); *G06T 2207/20021* (2013.01)

(58) Field of Classification Search
CPC .................................................. G06T 1/60
(Continued)

(56) References Cited

U.S. PATENT DOCUMENTS 7,702,878 B2    4/2010  MacInnis
2004/0080521 A1*  4/2004  Nose .................... G09G 3/3648
                                                        345/690
(Continued)

FOREIGN PATENT DOCUMENTS

CN          1338875 A      3/2002
CN          1997155 A      7/2007
(Continued)

OTHER PUBLICATIONS

Texas Instruments "Datasheet 32 k×8 Nonvolatile SRAM", SLUS118A, May 1999 Revised May 2007.*
(Continued)

*Primary Examiner* — Shivang Patel
(74) *Attorney, Agent, or Firm* — Winston Hsu

(57) ABSTRACT

A data arrangement method includes following steps: obtaining pixel data of a plurality of first N-bit pixels of a picture; and storing the obtained pixel data of the first N-bit pixels in a plurality of M-bit storage units of a first buffer according to a block-based scan order of the picture. The picture includes a plurality of data blocks, and the block-based scan order includes a raster-scan order for the data blocks. At least one of the M-bit storage units is filled with part of the obtained pixel data of the first N-bit pixels, M and N are positive integers, M is not divisible by N, and the first N-bit pixels include at least one pixel divided into a first part stored in one of the M-bit storage units in the first buffer and a second part stored in another of the M-bit storage units in the first buffer.

31 Claims, 24 Drawing Sheets

(51) Int. Cl.
*H04N 19/433* (2014.01)
*G06T 7/40* (2017.01)

(58) Field of Classification Search
USPC .......................................................... 345/549
See application file for complete search history.

(56) References Cited

U.S. PATENT DOCUMENTS

| | | | |
|---|---|---|---|
| 2004/0100661 A1* | 5/2004 | Tsumura | H04N 19/423 358/443 |
| 2005/0001857 A1 | 1/2005 | Nakakita | |
| 2010/0033496 A1 | 2/2010 | Mancuso | |
| 2010/0194769 A1 | 8/2010 | Mori | |
| 2011/0110433 A1* | 5/2011 | Bjontegaard | H04N 19/176 375/240.18 |

FOREIGN PATENT DOCUMENTS

| | | | |
|---|---|---|---|
| CN | 101022553 A | 8/2007 | |
| CN | 101212674 A | 7/2008 | |
| CN | 102129663 A | 7/2011 | |
| CN | 102947859 A | 2/2013 | |
| EP | 1 100 049 A2 | 5/2001 | |
| EP | 1 411 492 A1 | 4/2004 | |
| WO | 03001498 A1 | 1/2003 | |
| WO | 2011046446 A1 | 4/2011 | |

OTHER PUBLICATIONS

Jousha Moore "Understanding RAID", Jun. 11, 2017, https://www.bit-tech.net/reviews/tech/understanding_raid/2/.*
"International Search Report" dated Jul. 3, 2014 for International application No. PCT/CN2014/074308, International filing date Mar. 28, 2014.
"International Search Report" dated Jul. 4, 2014 for International application No. PCT/CN2014/074316, International filing date Mar. 28, 2014.
Chen, Title of Invention: Method and Apparatus for Arranging Pixels of Picture in Storage Units Each Having Storage Size Not Divisible by Pixel Size, U.S. Appl. No. 14/225,417, filed Mar. 25, 2014.
Chun-Chia Chen et al., Title: Method and Apparatus for Arranging Pixels of Picture in Storage Units Each Having Storage Size Not Divisible by Pixel Size , pending U.S. Appl. No. 15/343,233, filed Nov. 4, 2016.

* cited by examiner

METHOD AND APPARATUS FOR ARRANGING PIXELS OF PICTURE IN STORAGE UNITS EACH HAVING STORAGE SIZE NOT DIVISIBLE BY PIXEL SIZE

CROSS REFERENCE TO RELATED APPLICATIONS

The application claims the benefit of U.S. provisional application No. 61/806,591 (filed on Mar. 29, 2013) and U.S. provisional application No. 61/900,633 (filed on Nov. 6, 2013), which are incorporated herein by reference.

BACKGROUND

The disclosed embodiments of the present invention relate to storing a picture in a buffer, and more particularly, to a method and apparatus for arranging pixels of a picture (e.g., a frame or a field) in storage units (e.g., memory words) each having a storage size (e.g., 128 bits) not divisible by a pixel size (e.g., 10 or 12 bits).

Because of storage and transmission limitations, there is always a desire to reduce (or compress) the pixel data amount of one picture. Since the human visual system is much more sensitive to variations in brightness than color, a video system can be optimized by devoting more bandwidth to the brightness (luma) component Y, than to the color difference (chroma) components Cb and Cr. Typically, luma pixels and chroma pixels are 8 bits per pixel in most consumer applications due to the fact that a bit depth conventionally used by many video standards is 8 bits.

In certain applications, a picture may be stored in a buffer such that the buffered picture can be used later to achieve designed functionality. For example, in a video encoder or video decoder, a reconstructed picture is stored into a frame buffer such as a dynamic random access memory (DRAM), and may be used to serve as a reference picture for motion compensation or other functions. Specifically, due to the nature of video compression and decompression, the same data structure in the frame buffer is used for writing currently decoded pixels and reading previously decoded pixels. Hence, a data arrangement of pixel data of the picture in the frame buffer may affect the efficiency of video compression and decompression.

In general, a DRAM system has a word width determined by the actual design of the DRAM system. As demand for system performance continues to increase, the DRAM word width tends to increase accordingly. For example, each data word in a DRAM which acts as a frame buffer in a video encoder or video decoder may be configured to have a 128-bit word width (i.e., a 16-byte word width). The DRAM word width M is a power-of-two value (i.e., $M=2^m$). However, it is possible that the bit depth N of luma pixels and chroma pixels in the picture is not a power-of-two value (i.e., $N \neq 2^n$). For example, with the development of the video standard, a larger bit depth (e.g., 10 bits or 12 bits) may be supported. If M is not divisible by N, how to adequately arrange the N-bit luma pixels and N-bit chroma pixels of the picture in the M-bit DRAM words of the frame buffer becomes an issue to be solved in the pertinent field.

SUMMARY

In accordance with exemplary embodiments of the present invention, a method and apparatus for arranging pixels of a picture (e.g., a frame or a field) in storage units (e.g., memory words) each having a storage size (e.g., 128 bits) not divisible by a pixel size (e.g., 10 or 12 bits) are proposed.

According to a first aspect of the present invention, an exemplary data arrangement method is disclosed. The exemplary data arrangement method includes: obtaining pixel data of a plurality of first N-bit pixels of a picture; and storing the obtained pixel data of the first N-bit pixels in a plurality of M-bit storage units of a first buffer according to a block-based scan order of the picture, wherein the picture includes a plurality of data blocks, the block-based scan order includes a raster-scan order for the data blocks, at least one of the M-bit storage units is filled with part of the obtained pixel data of the first N-bit pixels, M and N are positive integers, M is not divisible by N, and the first N-bit pixels include at least one pixel divided into a first part stored in one of the M-bit storage units in the first buffer and a second part stored in another of the M-bit storage units in the first buffer.

According to a second aspect of the present invention, another exemplary data arrangement method is disclosed. The exemplary data arrangement method includes: obtaining pixel data of a plurality of first N-bit pixels of a picture; and storing at least the obtained pixel data of the first N-bit pixels in a plurality of M-bit storage units of a first buffer based on a block-based order of the picture, wherein the picture includes a plurality of data blocks, the block-based scan order includes a raster-scan order for the data blocks, each of the M-bit storage units of the first buffer stores an integer number of first N-bit pixels without any fractional first N-bit pixel, M and N are positive integers, and M is not divisible by N.

According to a third aspect of the present invention, yet another exemplary data arrangement method is disclosed. The exemplary data arrangement method includes: obtaining pixel data of a plurality of first N-bit pixels of a picture; obtaining pixel data of a plurality of second N-bit pixels of the picture; and storing the obtained pixel data of the first N-bit pixels and the obtained pixel data of the second N-bit pixels in a plurality of M-bit storage units of a buffer based on a block-based scan order of the picture, wherein each of the M-bit storage units of the buffer stores an integer number of first N-bit pixels without any fractional first N-bit pixel, and further stores an integer number of second N-bit pixels without any fractional second N-bit pixel; the first N-bit pixels are luma pixels; and the second N-bit pixels are chroma pixels.

According to a fourth aspect of the present invention, an exemplary data storage apparatus is disclosed. The exemplary data storage apparatus includes a buffer and a buffer controller. The buffer has a plurality of M-bit storage units. The buffer controller is arranged to obtain pixel data of a plurality of N-bit pixels of a picture, and store the obtained pixel data of the N-bit pixels in the M-bit storage units of the buffer based on a block-based scan order of the picture. The picture includes a plurality of data blocks, and the block-based scan order includes a raster-scan order for the data blocks. At least one of the M-bit storage units is filled with part of the obtained pixel data of the N-bit pixels, M and N are positive integers, M is not divisible by N, and the N-bit pixels include at least one pixel divided into a first part stored in one of the M-bit storage units in the buffer and a second part stored in another of the M-bit storage units in the buffer.

According to a fifth aspect of the present invention, another exemplary data storage apparatus is disclosed. The exemplary data storage apparatus includes a buffer and a buffer controller. The buffer has a plurality of M-bit storage units. The buffer controller is arranged to obtain pixel data of a plurality of N-bit pixels of a picture, and store at least the obtained pixel data of the N-bit pixels into the M-bit storage units of the buffer based on a block-based scan order of the picture. The picture includes a plurality of data blocks, and the block-based scan order includes a raster-scan order for the data blocks. Each of the M-bit storage units of the buffer stores an integer number of N-bit pixels without any fractional N-bit pixel, M and N are positive integers, and M is not divisible by N.

According to a sixth aspect of the present invention, yet another exemplary data storage apparatus is disclosed. The exemplary data storage apparatus includes a buffer and a buffer controller. The buffer has a plurality of M-bit storage units. The buffer controller is arranged to obtain pixel data of a plurality of first N-bit pixels of a picture; obtain pixel data of a plurality of second N-bit pixels of the picture; and store the obtained pixel data of the first N-bit pixels and the obtained pixel data of the second N-bit pixels in a plurality of M-bit storage units of a buffer based on a block-based scan order of the picture, wherein each of the M-bit storage units of the buffer stores an integer number of first N-bit pixels without any fractional first N-bit pixel, and further stores an integer number of second N-bit pixels without any fractional second N-bit pixel; the first N-bit pixels are luma pixels; and the second N-bit pixels are chroma pixels.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
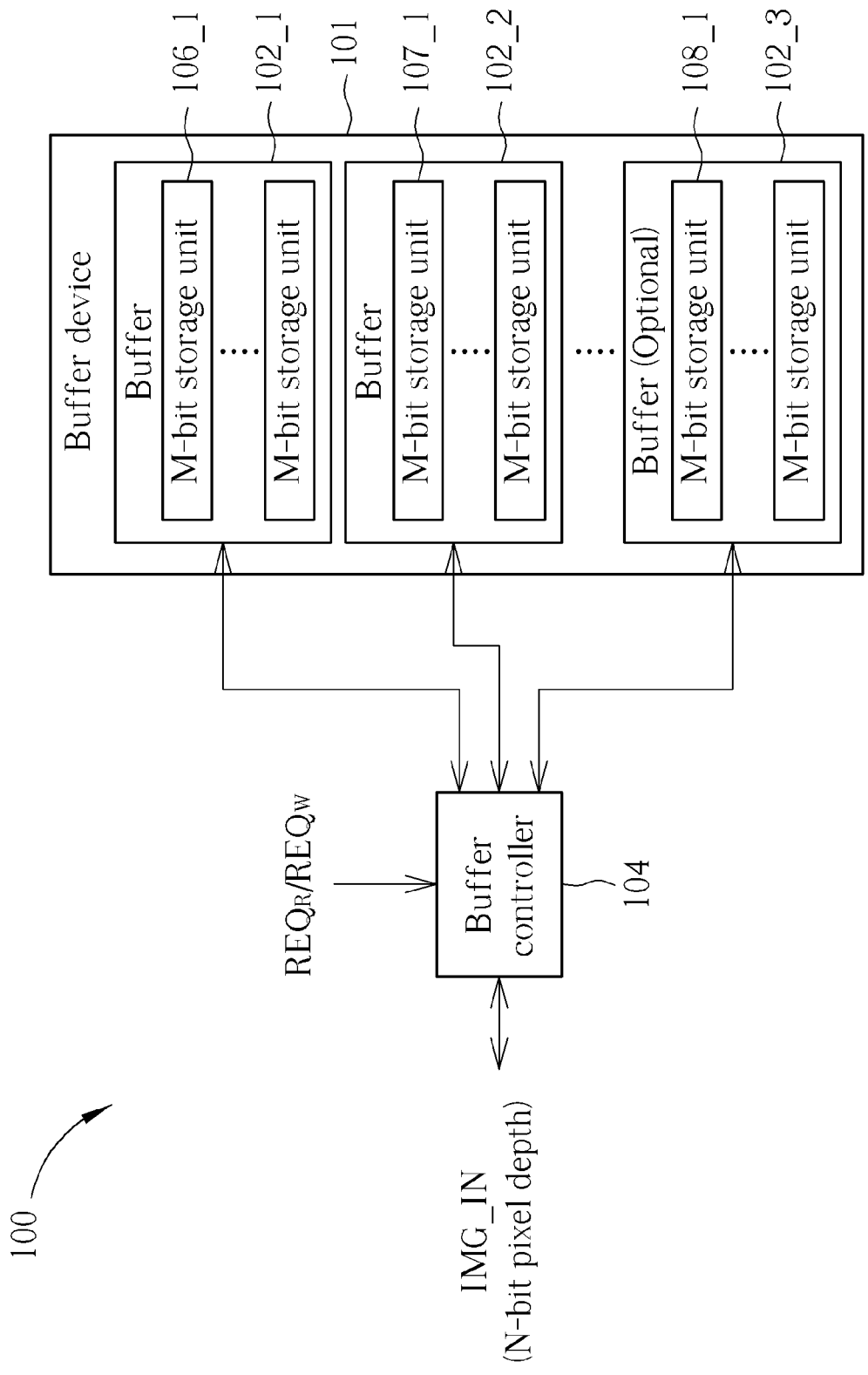
FIG. 1 is a block diagram illustrating a data storage apparatus according to an embodiment of the present invention.

FIG. 1 is a block diagram illustrating a data storage apparatus according to an embodiment of the present invention. The proposed data storage apparatus 100 may be employed in any application which needs to access a stored picture in a storage device. By way of example, but not limitation, the proposed data storage apparatus 100 may be employed in a video encoder or a video decoder, and the stored picture may be a reference picture used for motion compensation. In this embodiment, the data storage apparatus 100 includes a buffer device 101 and a buffer controller 104. The buffer device 101 may be a DRAM device configured to have one or more buffers (DRAMs) allocated therein. For example, in one exemplary design, the buffer device 101 has one buffer 102_1 arranged to store pixel data of luma pixels corresponding to the luminance component (Y) and another buffer 102_2 arranged to store pixel data of chroma pixels corresponding to different chrominance components (Cr, Cb; or U, V). In another exemplary design, the buffer device 101 has one buffer 102_1 arranged to store pixel data of luma pixels corresponding to the luminance component (Y), another buffer 102_2 arranged to store pixel data of chroma pixels corresponding to one chrominance component (Cb or U), and yet another buffer 102_3 arranged to store pixel data of chroma pixels corresponding to another chrominance component (Cr or V). In other words, the number of buffers implemented in the data storage apparatus 100 may be adjusted, depending upon actual design consideration.

The buffer controller 104 is arranged to control access (i.e., read and write) of the buffer device 101. When the buffer controller 104 receives a write request $REQ_W$ for requested data, the buffer controller 104 obtains pixel data of N-bit pixels of a picture IMG_IN, and refers to the proposed data arrangement to store the obtained pixel data of N-bit pixels of the picture IMG_IN in a plurality of M-bit storage units of one buffer (e.g., 102_1, 102_2, or 102_3) based on a block-based scan order of the picture IMG_IN, wherein the picture IMG_IN is divided into a plurality of data blocks, and the block-based scan order includes at least a raster-scan order for the data blocks in the picture IMG_IN (i.e., from the leftmost data block to the rightmost data block in each data block row of the picture IMG_IN and from the uppermost data block row to the lowermost data block row in the picture IMG_IN). M and N are positive integers, and M is not divisible by N. In this embodiment, M is a power-of-two value (e.g., M=128 (i.e., $2^7$)), and N is not a power-of-two value (e.g., N=10 or 12). When the buffer controller 104 receives a read request $REQ_R$ for requested data, the buffer controller 104 obtains stored pixel data of N-bit pixels from M-bit storage units of the buffer according to the proposed data arrangement.

It should be noted that the proposed data storage apparatus 100 may support a variety of color spaces. For example, when the picture IMG_IN entering the proposed data storage apparatus 100 is formatted in accordance with the YCbCr color space, the picture would include pixels of one luminance component (Y) and pixels of two chrominance components (Cb, Cr). For another example, when the picture IMG_IN entering the proposed data storage apparatus 100 is formatted in accordance with the YUV color space, the picture would include pixels of one luminance component (Y) and pixels of two chrominance components (U, V). For yet another example, when the picture IMG_IN entering the proposed data storage apparatus 100 is formatted in accordance with a color space other than the YUV color space and the YCbCr color space, the picture may include pixels of at least one luminance component and pixels of multiple chrominance components. To put it simply, the proposed data storage apparatus 100 is compliant with any color space having at least one luminance component and a plurality of chrominance components. For clarity and simplicity, the following assumes that the picture IMG_IN to be buffered is formatted in accordance with the YCbCr color space. However, this is for illustrative purposes only, and is not meant to be a limitation of the present invention.

In a first proposed data arrangement with block-based scan layout, at least one of the M-bit storage units is filled with part of the obtained pixel data of the N-bit pixels, and the N-bit pixels include at least one pixel divided into a first part stored in one of the M-bit storage units in the buffer and a second part stored in another of the M-bit storage units in the same buffer. It should be noted that the first proposed data arrangement may be applied to the picture IMG_IN having a 4:4:4 color format, a 4:2:2 color format, or a 4:2:0 color format. Several exemplary designs of the first proposed data arrangement are detailed as below.

Concerning the first exemplary data arrangement design, the buffer controller 104 is configured for continuously storing the obtained pixel data of the N-bit pixels in the M-bit storage units of the buffer one by one according to the block-based scan order of the picture IMG_IN, until all of the obtained pixel data are stored in the buffer. In other words, one M-bit storage unit will be filled with pixel data if pixel data of all N-bit pixels (e.g., luma pixels or chroma pixels) in the picture IMG_IN are not completely stored in the buffer yet.

Figure 2:
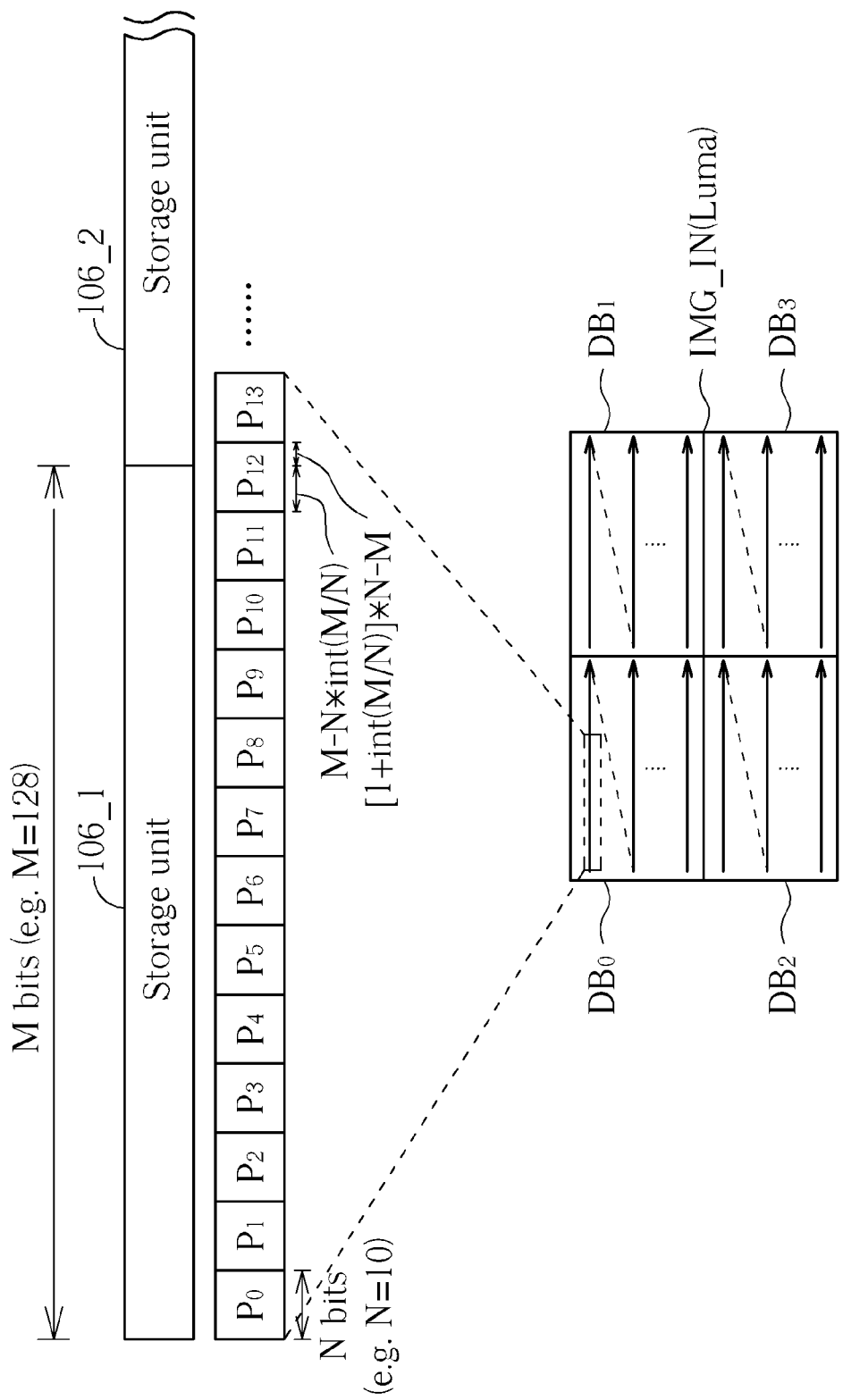
FIG. 2 is a diagram illustrating a data arrangement of luma pixels in one buffer according to the first exemplary data arrangement design of the present invention.

Please refer to FIG. 2, which is a diagram illustrating a data arrangement of luma pixels in one buffer according to the first exemplary data arrangement design of the present invention, where at least one storage unit is filled with luma pixel data, and at least one luma pixel is divided into two parts stored in different storage units. As mentioned above, the buffer controller 104 stores luma pixels in the buffer 102_1. Each of the luma pixels in the picture IMG_IN has N bits, and each of the storage units in the buffer 102_1 has M bits. For example, N=10 and M=128 in this embodiment. Since M is not divisible by N, the size of one storage unit (e.g., a 128-bit DRAM word) is not equal to an accumulated size of an integer number of luma pixels. As shown in FIG. 2, the picture IMG_IN has a plurality of data blocks (e.g., $DB_0$, $DB_1$, $DB_2$, $DB_3$, each composed of a plurality of luma pixels). It should be noted that the number of data blocks defined in the picture IMG_IN in FIG. 2 is for illustrative purposes only, and is not meant to be a limitation of the present invention. The block-based scan order of the picture IMG_IN in FIG. 2 includes a raster scan order for the data blocks in the picture IMG_IN (e.g., $DB_0 \rightarrow DB_1 \rightarrow DB_2 \rightarrow DB_3$), and further includes a raster-scan order for N-bit luma pixels in each data block. When the number of luma pixels stored in the current storage unit 106_1 reaches int (M/N), the remaining storage space in the current storage unit 106_1 is smaller than the size of one luma pixel, where int ( ) is a toward-0 integer division, i.e., an integer division with truncation of the result toward zero. For example, 9/4 is truncated to 2 by the toward-0 integer division. Specifically, supposing that the color format is 4:2:0, when 12 luma pixels $P_0$-$P_{11}$, each having 10 bits, are stored in the 128-bit storage unit 106_1, the remaining storage space in the 128-bit storage unit 106_1 only has 8 bits (i.e., M−N*int (M/N)=8). Since pixel data of luma pixels in the picture IMG_IN are continuously stored into the buffer 102_1 based on the block-based scan order (which includes a raster-scan order for luma pixels in each data block of the picture IMG_IN), the next pixel $P_{12}$ is divided into a first part stored in the current storage unit 106_1 and a second part stored in the next storage unit 106_2, where the size of the first part is 8 bits (i.e., M−N*int (M/N)=8), and the size of the second part is 2 bits (i.e., [1+int (M/N)]*N−M=2). In this way, storage units are sequentially filled with data of luma pixels of the picture IMG_IN until all of the luma pixels are stored in the buffer 102_1.

It should be noted that, since M is not divisible by N, the M-bit storage unit would have a storage space with the size of M−N*int (M/N) for storing partial data of one or two luma pixels. More specifically, there may be three cases. In a first case, only the leftmost luma pixel in a storage unit (not shown in FIG. 2) is a divided luma pixel. In a second case, only the rightmost luma pixel in a storage unit (e.g., 106_1 in FIG. 2) is a divided luma pixel. In a third case, the leftmost pixel and the rightmost luma pixel in a storage unit (e.g., 106_2 in FIG. 2) are both divided luma pixels.

Figure 3:
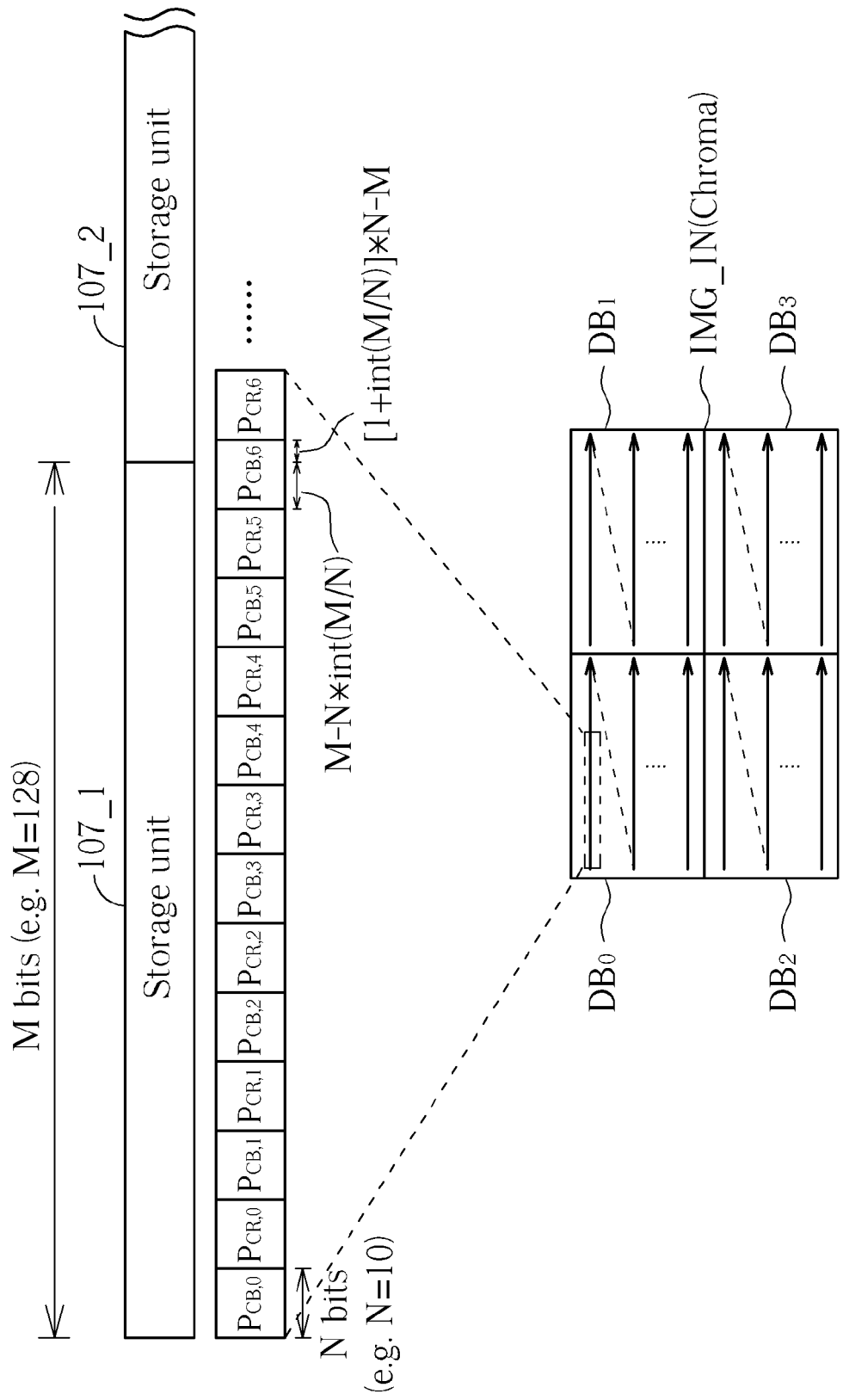
FIG. 3 is a diagram illustrating a data arrangement of chroma pixels of different chrominance components in one buffer according to the first exemplary data arrangement design of the present invention.

Please refer to FIG. 3, which is a diagram illustrating a data arrangement of chroma pixels of different chrominance components in one buffer according to the first exemplary data arrangement design of the present invention, where at least one storage unit is filled with chroma pixel data, and at least one chroma pixel is divided into two parts stored in different storage units. As mentioned above, the buffer controller 104 stores chroma pixels of different chrominance components (Cb, Cr) in the same buffer 102_2, where chroma pixels of one chrominance component (Cb) and chroma pixels of another chrominance component (Cr) are stored in an interleaved arrangement such as Cb-Cr-Cb-Cr or Cr-Cb-Cr-Cb. Each of the chroma pixels in the picture IMG_IN has N bits, and each of the storage units in the buffer 102_2 has M bits. For example, N=10 and M=128. Since M is not divisible by N, the size of one storage unit (e.g., a 128-bit DRAM word) is not equal to an accumulated size of an integer number of chroma pixels. As shown in FIG. 3, the picture IMG_IN has a plurality of data blocks (e.g., $DB_0$, $DB_1$, $DB_2$, $DB_3$, each composed of a plurality of chroma pixels). It should be noted that the number of data blocks defined in the picture IMG_IN in FIG. 3 is for illustrative purposes only, and is not meant to be a limitation of the present invention. The block-based scan order of the picture IMG_IN in FIG. 3 includes a raster scan order for the data blocks in the picture IMG_IN (e.g., $DB_0 \rightarrow DB_1 \rightarrow DB_2 \rightarrow DB_3$), and a raster-scan order for N-bit chroma pixels in each data block. When the number of chroma pixels stored into the current storage unit 107_1 reaches int (M/N), the remaining storage space in the current storage unit 107_1 is smaller than the size of one chroma pixel. Specifically, supposing that the color format of the picture IMG_IN is 4:2:0 and the Cb-Cr-Cb-Cr interleaved arrangement is employed, when 12 chroma pixels $P_{CB, 0}$, $P_{CR, 0}$, $P_{CB, 1}$, $P_{CR, 1}$ ... $P_{CB, 5}$, $P_{CR, 5}$, each having 10 bits, are stored into the 128-bit storage unit 107_1, the remaining storage space in the 128-bit storage unit 107_1 only has 8 bits (i.e., M−N*int (M/N)=8). Since pixel data of chroma pixels of each chrominance component in the picture IMG_IN are sequentially stored into the buffer 107_1 based on the block-based scan order (which includes a raster-scan order for chroma pixels in each data block of the picture IMG_IN) and the Cb-Cr-Cb-Cr interleaved arrangement, the next chroma pixel $P_{CB, 6}$ is divided into a first part stored in the current storage unit 107_1 and a second part stored in the next storage unit 107_2, where the size of the first part is 8 bits (i.e., M−N*int (M/N)=8), and the size of the second part is 2 bits (i.e., [1+int (M/N)]*N−M=2). In this way, storage units are sequentially filled with data of chroma pixels of the picture IMG_IN until all of the chroma pixels are stored in the buffer 102_2.

Since M is not divisible by N, the M-bit storage unit would have a storage space with the size of M−N*int (M/N) for storing partial data of one or two chroma pixels. Similarly, there may be three cases. In a first case, only the leftmost chroma pixel in a storage unit (not shown in FIG. 3) is a divided chroma pixel. In a second case, only the rightmost chroma pixel in a storage unit (e.g., 107_1 in FIG. 3) is a divided chroma pixel. In a third case, the leftmost pixel and the rightmost chroma pixel in a storage unit (e.g., 107_2) are both divided chroma pixels.

Figure 4:
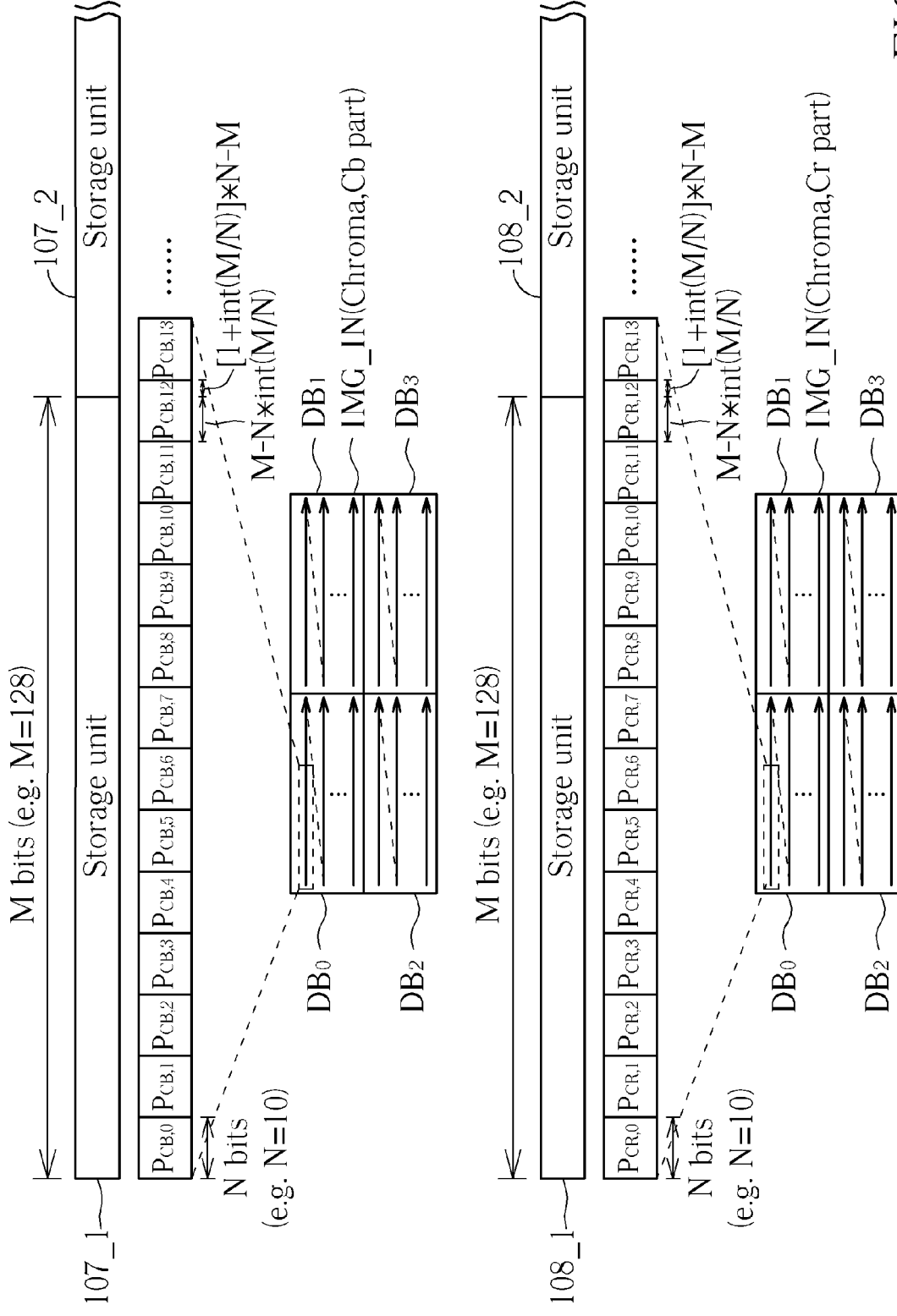
FIG. 4 is a diagram illustrating a data arrangement of chroma pixels of one chrominance component in one buffer and chroma pixels of another chrominance component in another buffer according to the first exemplary data arrangement design of the present invention.

Please refer to FIG. 4, which is a diagram illustrating a data arrangement of chroma pixels of one chrominance component in one buffer and chroma pixels of another chrominance component in another buffer according to the first exemplary data arrangement design of the present invention, where at least one storage unit in each buffer is filled with chroma pixel data, and at least one chroma pixel of each chrominance component is divided into two parts stored in different storage units. As mentioned above, the buffer controller 104 stores chroma pixels corresponding to a first chrominance component (Cb) in the buffer 102_2, and stores chroma pixels corresponding to a second chrominance component (Cr) in the buffer 102_3. In other words, the buffer 102_2 may be dedicated to storing chroma pixels of the first chrominance component (Cb) only, and the buffer 102_3 may be dedicated to storing chroma pixels of the second chrominance component (Cr) only. Each of the chroma pixels in the picture IMG_IN has N bits, and each of the storage units in the buffers 102_2 and 102_3 has M bits. For example, N=10 and M=128. Since M is not divisible by N, the size of one storage unit (e.g., a 128-bit DRAM word) is not equal to an accumulated size of an integer number of chroma pixels.

As shown in FIG. 4, the picture IMG_IN has a plurality of data blocks (e.g., $DB_0$, $DB_1$, $DB_2$, $DB_3$, each composed of a plurality of chroma pixels corresponding to different chrominance components). It should be noted that the number of data blocks defined in the picture IMG_IN in FIG. 4 is for illustrative purposes only, and is not meant to be a limitation of the present invention. The block-based scan order of the picture IMG_IN in FIG. 4 includes a raster scan order for the data blocks in the picture IMG_IN (e.g., $DB_0 \rightarrow DB_1 \rightarrow DB_2 \rightarrow DB_3$), and a raster-scan order for N-bit chroma pixels of each chrominance component in each data block. When the number of chroma pixels of the chrominance component Cb stored into the current storage unit 107_1 reaches int (M/N), the remaining storage space in the current storage unit 107_1 is smaller than the size of one chroma pixel of the chrominance component Cb. Specifically, supposing that the color format of the picture IMG_IN is 4:4:4, when 12 chroma pixels $P_{CB, 0}$-$P_{CB, 11}$, each having 10 bits, are stored into the 128-bit storage unit 107_1, the remaining storage space in the 128-bit storage unit 107_1 only has 8 bits (i.e., M−N*int (M/N)=8). Since pixel data of chroma pixels of the chrominance component Cb in the picture IMG_IN are continuously stored into the buffer 102_2 based on the block-based scan order (which includes a raster-scan order for chroma pixels of the chrominance component Cb in each data block of the picture IMG_IN), the next chroma pixel $P_{CB,\,12}$ is divided into a first part stored in the current storage unit 107_1 and a second part stored in the next storage unit 107_2, where the size of the first part is 8 bits (i.e., M−N*int (M/N)=8), and the size of the second part is 2 bits (i.e., [1+int (M/N)]*N−M=2). In this way, storage units are sequentially filled with data of chroma pixels of the chrominance component Cb of the picture IMG_IN, until all of the chroma pixels of the chrominance component Cb are stored in the buffer 102_2. Since M is not divisible by N, the M-bit storage unit would have a storage space with the size of M−N*int (M/N) for storing partial data of one or two chroma pixels of the chrominance component Cb. Similarly, there may be three cases. In a first case, only the leftmost chroma pixel in a storage unit (not shown in FIG. 4) is a divided chroma pixel. In a second case, only the rightmost chroma pixel in a storage unit (e.g., 107_1 in FIG. 4) is a divided chroma pixel. In a third case, the leftmost pixel and the rightmost chroma pixel in a storage unit (e.g., 107_2 in FIG. 4) are both divided chroma pixels.

When the number of chroma pixels of the other chrominance component Cr stored into the current storage unit 108_1 reaches int (M/N), the remaining storage space in the current storage unit 108_1 is smaller than the size of one chroma pixel of the chrominance component Cr. Specifically, supposing that the color format of the picture IMG_IN is 4:4:4, when 12 chroma pixels $P_{CR,\,0}$-$P_{CR,\,11}$, each having 10 bits, are stored into the 128-bit storage unit 108_1, the remaining storage space in the 128-bit storage unit 108_1 only has 8 bits (i.e., M−N*int (M/N)=8). Since pixel data of chroma pixels of the chrominance component Cr in the picture IMG_IN are continuously stored in the buffer 102_3 based on the block-based scan order (which includes a raster-scan order of chroma pixels of the chrominance component Cr in each data block of the picture IMG_IN), the next chroma pixel $P_{CR,\,12}$ is divided into a first part stored in the current storage unit 108_1 and a second part stored in the next storage unit 108_2, where the size of the first part is 8 bits (i.e., M−N*int (M/N)=8), and the size of the second part is 2 bits (i.e., [1+int (M/N)]*N−M=2). In this way, storage units are sequentially filled with data of chroma pixels of the chrominance component Cr of the picture IMG_IN, until all of the chroma pixels of the chrominance component Cr are stored in the buffer 102_3. Since M is not divisible by N, the M-bit storage unit would have a storage space with the size of M−N*int (M/N) for storing partial data of one or two chroma pixels of the chrominance component Cr. Similarly, there may be three cases. In a first case, only the leftmost chroma pixel in a storage unit (not shown in FIG. 4) is a divided chroma pixel. In a second case, only the rightmost chroma pixel in a storage unit (e.g., 108_1) is a divided chroma pixel. In a third case, the leftmost pixel and the rightmost chroma pixel in a storage unit (e.g., 108_2) are both divided chroma pixels.

Concerning each of the aforementioned data arrangements that are based on the first exemplary data arrangement design, the buffer controller 104 is configured for referring to the block-based scan order of the picture IMG_IN to continuously store the obtained pixel data of the N-bit pixels (e.g., luma pixels, chroma pixels of different chrominance components, or chroma pixels of one chrominance component) in the M-bit storage units of a single buffer one by one, until all of the obtained pixel data are stored in the buffer. In this way, the N-bit pixels would have at least one pixel divided into two parts stored in different M-bit storage units in the buffer due to continuous arrangement of pixel data in the storage units. However, this is for illustrative purposes only, and is not meant to be a limitation of the present invention. Alternatively, the first exemplary data arrangement design may be modified to consider additional conditions when deciding an arrangement of each N-bit pixel in a buffer. Hence, the present invention therefore further proposes a second exemplary data arrangement design which includes the aforementioned feature of continuous arrangement of pixel data in one storage unit and an additional feature of discontinuous arrangement of pixel data in another storage unit.

Specifically, concerning the additional feature of discontinuous arrangement of pixel data, the second exemplary data arrangement design defines that, a leftmost N-bit pixel (e.g., a luma pixel or a chroma pixel) in an uppermost pixel row of each data block in the picture IMG_IN would not be a pixel divided into two parts stored in different M-bit storage units. For example, after storing pixel data of a rightmost N-bit pixel in a current pixel row of a current data block in the picture IMG_IN into a current M-bit storage unit, the buffer controller 104 stores pixel data of the next pixel (i.e., a leftmost N-bit pixel in an uppermost pixel row of a next data block in the picture IMG_IN) in a next M-bit storage unit of the buffer no matter whether the current M-bit storage unit still has unused bit(s). Concerning any pixel which is not a leftmost pixel in an uppermost pixel row of a data block, the second exemplary data arrangement design continuously stores the pixel data into the storage unit, like the first exemplary data arrangement design. The major difference between the first exemplary data arrangement design and the second exemplary data arrangement design is that the second exemplary data arrangement design ensures that at least a portion (i.e., part or all) of the rightmost pixel in a lowermost pixel row of a current data block and at least a portion (i.e., part or all) of the leftmost pixel in an uppermost pixel row of a next data block are not stored in the same storage unit. Thus, when pixel data of the leftmost pixel in an uppermost pixel row of a data block are stored in the buffer, the stored leftmost pixel would never be across a boundary between two storage units.

Figure 5:
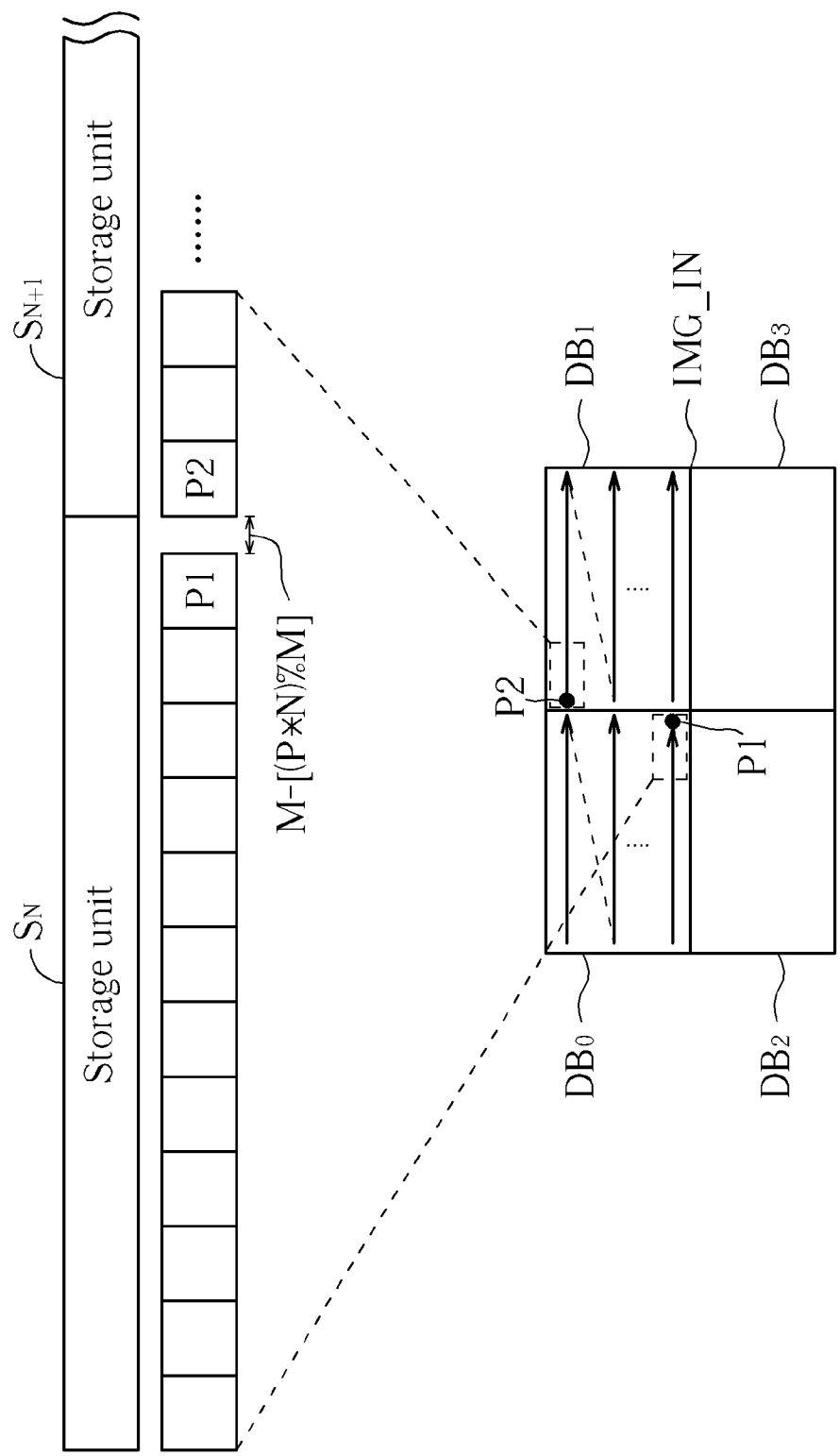
FIG. 5 is a diagram illustrating a data arrangement of pixels in a buffer according to a second exemplary data arrangement design of the present invention.

Please refer to FIG. 5, which is a diagram illustrating a data arrangement of pixels in a buffer according to a second exemplary data arrangement design of the present invention, where the leftmost pixel in an uppermost pixel row of one data block would never be across a boundary between two storage units. Each of the pixels (e.g., luma pixels and chroma pixels) in the picture IMG_IN has N bits, and each of the storage units in the buffer 102_1/102_2/102_3 has M bits. For example, N=10 and M=128. Since M is not divisible by N, the size of one storage unit (e.g., a 128-bit DRAM word) is not equal to an accumulated size of an integer number of pixels. When the current pixel (e.g., luma pixel or chroma pixel) P1 is the rightmost pixel in a lowermost pixel row of one data block (e.g., $DB_0$ in FIG. 5), the next pixel specified by the block-based scan order (which includes a raster-scan order for data blocks and a raster-scan order for pixels in each data block) is the leftmost pixel (e.g., luma pixel or chroma pixel) P2 in an uppermost pixel row of the next data block (e.g., $DB_1$ in FIG. 5). If each data block has P pixels, the bit size of each data block is equal to P*N. When P*N is divisible by M, the pixel P1 would be fully stored in one storage unit to be the last pixel (i.e., the rightmost pixel) in the storage unit, and the pixel P2 would be fully stored in another storage unit to be the first pixel (i.e., the leftmost pixel) in another storage unit. Thus, in accordance with the first exemplary data arrangement design mentioned above (i.e., one of the data arrangements shown in FIG. 2-FIG. 4), there is no need to divide the pixel P2 into two parts stored in different storage units.

However, in accordance with the first exemplary data arrangement design of the present invention (i.e., one of the data arrangements shown in FIG. 2-FIG. 4), when P*N is not divisible by M, the pixel P2 is divided two parts stored in different storage units if M−[(P*N) % M]<N; and all pixel data of the pixel P2 are continuously stored into the storage unit where the pixel P1 is stored if M−[(P*N) % M]≥N. In certain applications, it is preferred that the pixel P2 is ensured to be fully stored in a storage unit to be the first pixel (i.e., the leftmost pixel) in the storage unit. Hence, the proposed second exemplary data arrangement design may be employed to achieve this goal. When P*N is not divisible by M, the buffer controller 104 would make one storage unit have a reserved storage space with empty bits (i.e., don't care bits) at pre-defined bit locations, where the size of the reserved storage space is equal to M−[(P*N) % M]. As shown in FIG. 5, after the pixel data of the rightmost pixel P1 in the lowermost pixel row of the current data block $DB_0$ are stored in the storage unit $S_N$, the remaining storage space (i.e., the reserved storage space) is not used for storing pixel data. Therefore, when scanning to the next pixel based on the block-based scan order, the buffer controller 104 stores the leftmost pixel P2 in the uppermost pixel row of the next data block $DB_1$ to the next storage unit $S_{N+1}$. In this way, the pixel P2 is not across a boundary of two storage units $S_N$ and $S_{N+1}$.

In the first exemplary data arrangement design (FIG. 2-FIG. 4), all of the N-bit pixels (e.g., luma pixels or chroma pixels) in the picture IMG_IN are continuously stored in M-bit storage units based on a specific block-based scan order including a raster-scan order for data blocks and a raster-scan order for pixels in each data block. However, the partitioning of the picture IMG_IN and/or the setting of the block-based scan order of the picture IMG_IN can be adjusted, thus resulting in a different data arrangement design. The present invention further proposes a third exemplary data arrangement design which makes an integer number of M-bit storage units filled with all pixel data of a compact unit defined in a data block of the picture. For example, each of the N-bit pixel in the picture is divided into a first part and a second part stored in different M-bit storage units of the buffer respectively; besides, successive M-bit storage units in a buffer include a plurality of first M-bit storage units and a second M-bit storage unit preceding the first M-bit storage units, where the first M-bit storage units are filled with first parts of N-bit pixels in a compact unit, and the second M-bit storage unit is filled with second parts of N-bit pixels in the same compact unit.

Figure 6:
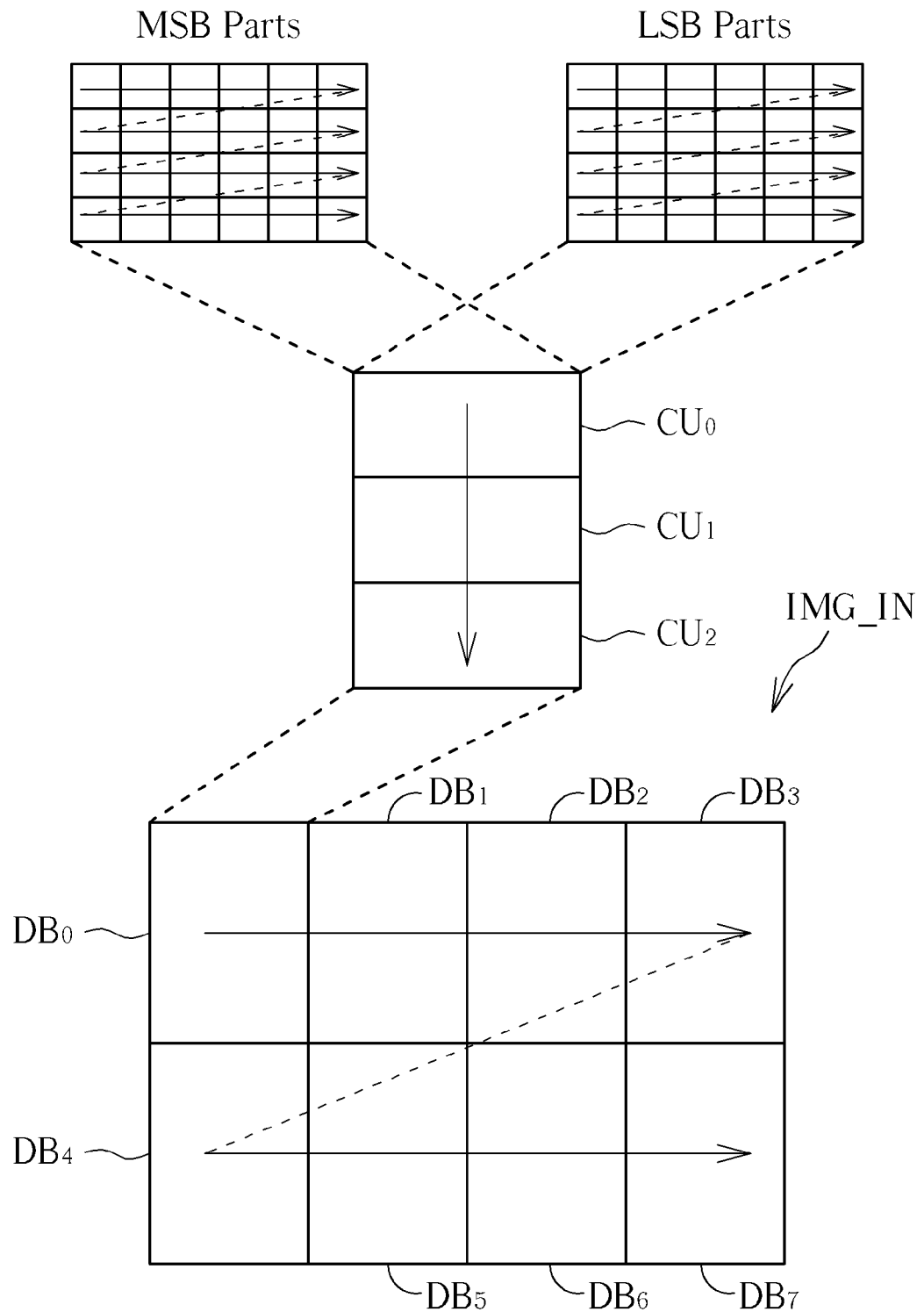
FIG. 6 is a diagram illustrating a first alternative design of the partitioning of the picture and the setting of the block-based scan order of the picture according to an embodiment of the present invention.

Please refer to FIG. 6, which is a diagram illustrating a first alternative design of the partitioning of the picture IMG_IN and the setting of the block-based scan order of the picture IMG_IN according to an embodiment of the present invention. As shown in FIG. 6, the picture IMG_IN is partitioned into a plurality of data blocks (e.g., $DB_0$-$DB_7$), each of the data blocks is partitioned into a plurality of compact units (e.g., $CU_0$, $CU_1$, and $CU_2$) arranged vertically in the data block, and each of the compact units includes a plurality of pixels. It should be noted that the number of data blocks in one picture and the number of compact units in one data block can be adjusted, depending upon actual design consideration. In this embodiment, the pixel data of each pixel is divided into a first part and a second part that are stored in different storage units in a buffer. Specifically, regarding each N-bit pixel, the first part is a more significant bit (MSB) part having N1 bits, and the second part is a less significant bit (LSB) part having N2 bits, where N=N1+N2, N1>N2, and M is divisible by each of N1 and N2. For example, M=128, N=10, N1=8, and N2=2. The block-based scan order of the picture IMG_IN in FIG. 6 includes a raster-scan order for data blocks in the picture IMG_IN (e.g., $DB_0$→$DB_1$→$DB_2$→$DB_3$→$DB_4$→$DB_5$→$DB_6$→$DB_7$), a vertical scan order for compact units vertically arranged in each data block (e.g., $CU_0$→$CU_1$→$CU_2$), a raster-scan order for MSB parts in each compact unit, and a raster-scan order for LSB parts in each compact unit.

Figure 7:
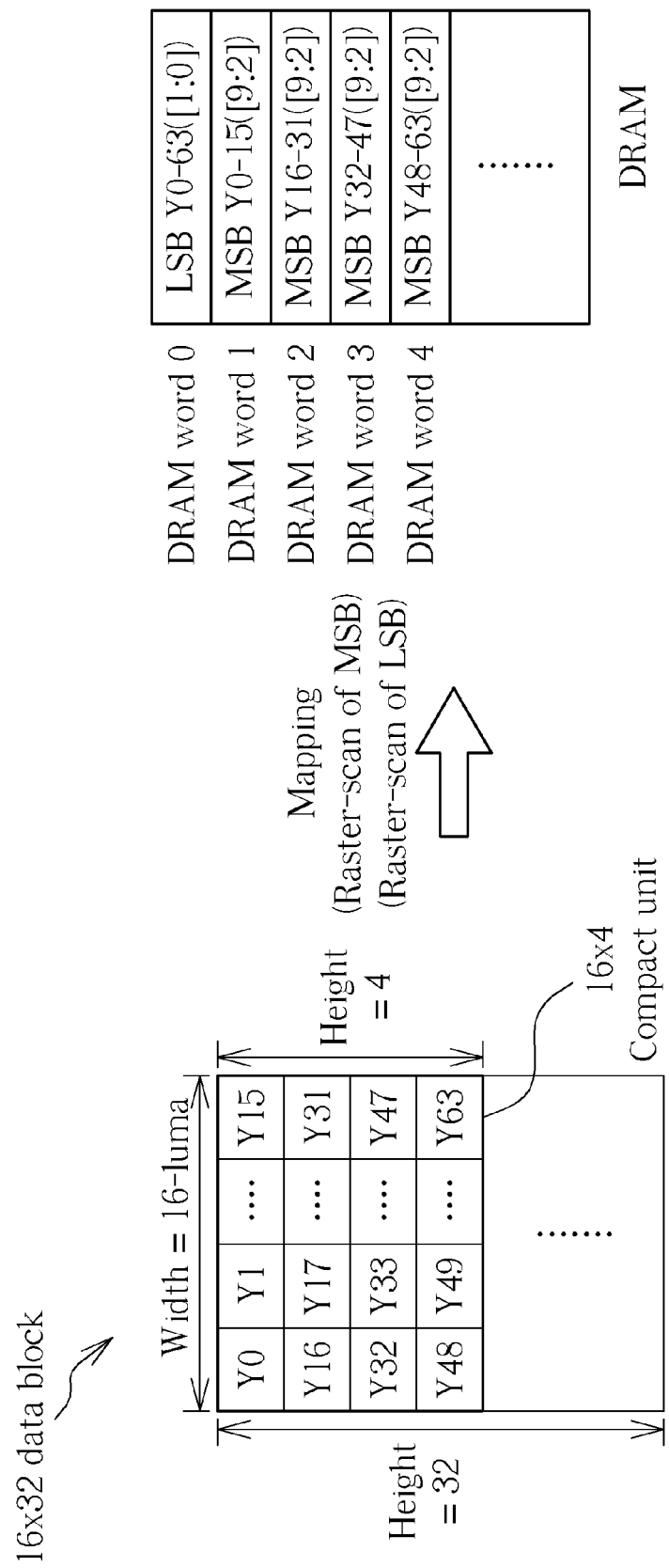
FIG. 7 is a diagram illustrating a data arrangement of luma pixels in one buffer according to the third exemplary data arrangement design of the present invention.

In accordance with the partitioning of the picture IMG_IN and the setting of the block-based scan order of the picture IMG_IN shown in FIG. 6, several exemplary data arrangements can be obtained. Please refer to FIG. 7, which is a diagram illustrating a data arrangement of luma pixels in one buffer according to the third exemplary data arrangement design of the present invention, where each of the luma pixels in the picture is divided into a first part (e.g., an MSB part) and a second part (e.g., an LSB part) stored in different storage units. In this example, one 16×32 data block is divided into a plurality of 16×4 compact units, and each 16×4 compact unit is composed of a plurality of N-bit luma pixels Y0-Y63. As mentioned above, the buffer controller 104 stores luma pixels into the buffer 102_1 having M-bit storage units. For example, the buffer 102_1 is implemented using a DRAM. In a case where M=128 and N=10, five successive DRAM words are used for storing all pixel data of the luma pixels Y0-Y63 in one 16×4 compact unit, the MSB part of each 10-bit luma pixel includes bit[2]-bit[9], and the LSB part of each 10-bit luma pixel includes bit [0] and bit [1]. Based on the block-based scan order (which includes a raster-scan order for MSB parts in each compact unit and a raster-scan order for LSB parts in each compact unit), 2-bit LSB parts of luma pixels Y0-Y63 are sequentially stored in DRAM word 0, 8-bit MSB parts of luma pixels Y0-Y15 are sequentially stored in DRAM word 1, 8-bit MSB parts of luma pixels Y16-Y31 are sequentially stored in DRAM word 2, 8-bit MSB parts of luma pixels Y32-Y47 are sequentially stored in DRAM word 3, and 8-bit MSB parts of luma pixels Y48-Y63 are sequentially stored in DRAM word 4.

Figure 8:
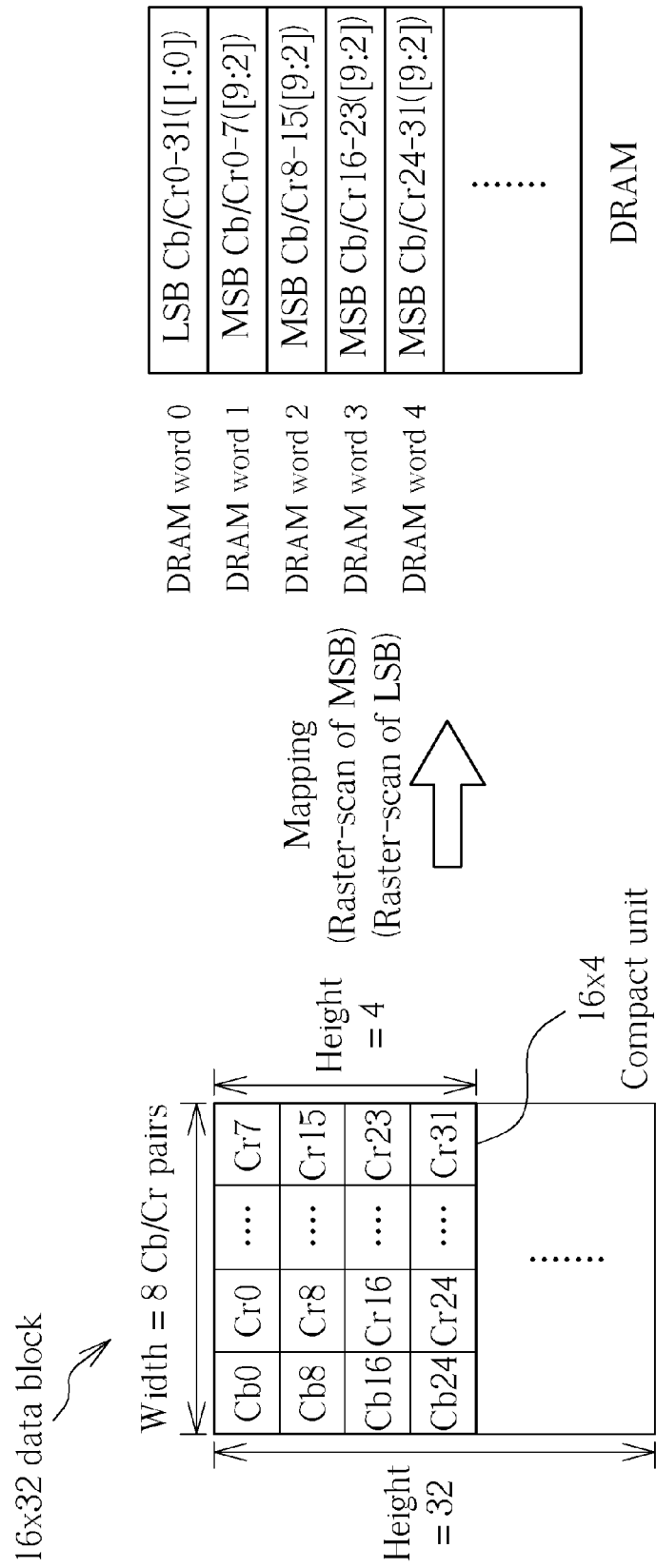
FIG. 8 is a diagram illustrating a data arrangement of chroma pixels of different chrominance components in one buffer according to the third exemplary data arrangement design of the present invention.

Please refer to FIG. 8, which is a diagram illustrating a data arrangement of chroma pixels of different chrominance components in one buffer according to the third exemplary data arrangement design of the present invention, where each of the chroma pixels in the picture is divided into a first part (e.g., an MSB part) and a second part (e.g., an LSB part) stored in different storage units. In this example, one 16×32 data block is divided into a plurality of 16×4 compact units, and each 16×4 compact unit is composed of a plurality of 2N-bit chroma pixel pairs (Cb0, Cr0), (Cb1, Cr1) . . . (Cb31, Cr31). As mentioned above, the buffer controller 104 stores chroma pixels of different chrominance components (Cb, Cr) in the same buffer 102_2 having M-bit storage units. For example, the buffer 102_2 is implemented using a DRAM. In a case where M=128 and N=10, five successive DRAM words are used for storing all pixel data of the chroma pixels Cb0-Cb31 and Cr0-Cr31 in one 16×4 compact unit, the MSB part of each 10-bit chroma pixel includes bit [2]-bit [9], and the LSB part of each 10-bit chroma pixel includes bit [0] and bit[1]. Based on the block-based scan order (which includes a raster-scan order for MSB parts in each compact unit and a raster-scan order for LSB parts in each compact unit), 2-bit LSB parts of chroma pixels Cb0, Cr0 . . . Cb31, Cr31 are sequentially stored in DRAM word 0, 8-bit MSB parts of chroma pixels Cb0, Cr0 . . . Cb7, Cr7 are sequentially stored in DRAM word 1, 8-bit MSB parts of chroma pixels Cb8, Cr8 . . . Cb15, Cr15 are sequentially stored in DRAM word 2, 8-bit MSB parts of chroma pixels Cb16, Cr16 . . . Cb23, Cr23 are sequentially stored in DRAM word 3, and 8-bit MSB parts of chroma pixels Cb24, Cr24 . . . Cb31, Cr31 are sequentially stored in DRAM word 4.

Figure 9:
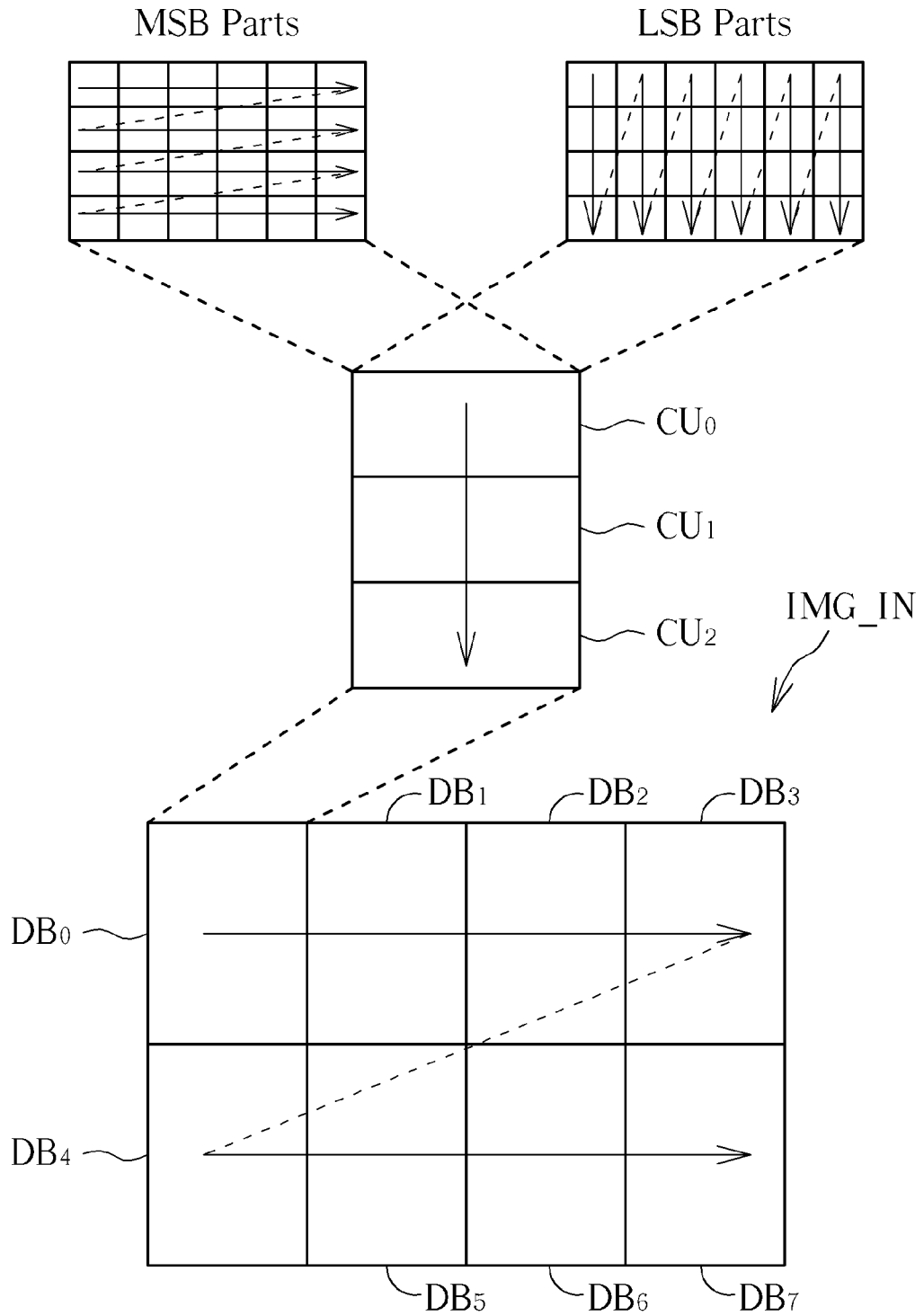
FIG. 9 is a diagram illustrating a second alternative design of the partitioning of the picture and the setting of the block-based scan order of the picture according to an embodiment of the present invention.

Please refer to FIG. 9, which is a diagram illustrating a second alternative design of the partitioning of the picture IMG_IN and the setting of the block-based scan order of the picture IMG_IN according to an embodiment of the present invention. As shown in FIG. 9, the picture IMG_IN is partitioned into a plurality of data blocks (e.g., $DB_0$-$DB_7$), each of the data blocks is partitioned into a plurality of compact units (e.g., $CU_0$, $CU_1$, and $CU_2$) arranged vertically in the data block, and each of the compact units includes a plurality of pixels. It should be noted that the number of data blocks in one picture and the number of compact units in one data block can be adjusted, depending upon actual design consideration. In this embodiment, the pixel data of each pixel is divided into a first part and a second part that are stored in different storage units in a buffer. Specifically, regarding each N-bit pixel, the first part is an N1-bit MSB part, and the second part is an N2-bit LSB part, where N=N1+N2, N1>N2, and M is divisible by each of N1 and N2. For example, M=128, N=10, N1=8, and N2=2. The block-based scan order of the picture IMG_IN in FIG. 9 includes a raster-scan order for data blocks in the picture IMG_IN (e.g., $DB_0 \rightarrow DB_1 \rightarrow DB_2 \rightarrow DB_3 \rightarrow DB_4 \rightarrow DB_5 \rightarrow DB_6 \rightarrow DB_7$), a vertical scan order for compact units vertically arranged in each data block (e.g., $CU_0 \rightarrow CU_1 \rightarrow CU_2$), a raster-scan order for MSB parts in each compact unit, and a vertical scan order for LSB parts in each compact unit (i.e., from an uppermost pixel to a lowermost pixel in each pixel column of the compact unit and from a leftmost pixel column to a rightmost pixel column in the compact unit).

Figure 10:
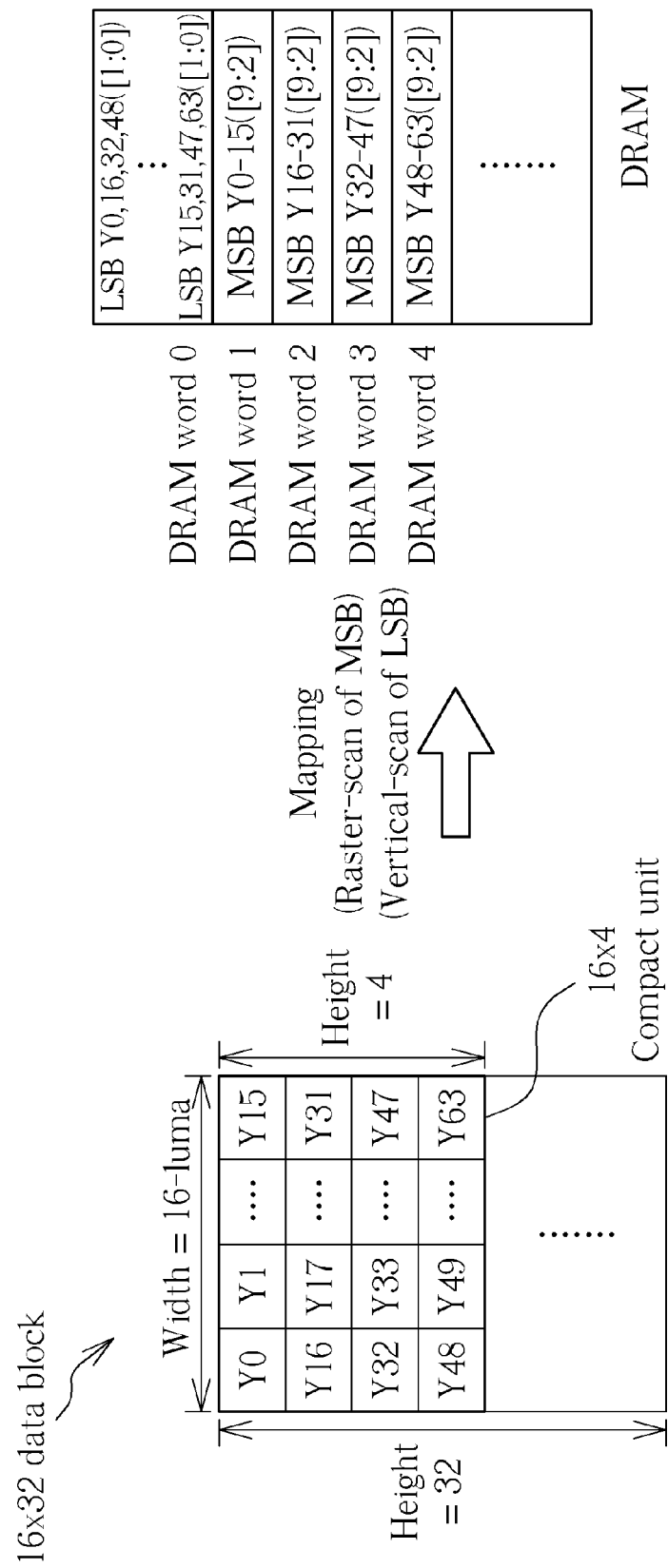
FIG. 10 is a diagram illustrating another data arrangement of luma pixels in one buffer according to the third exemplary data arrangement design of the present invention.

In accordance with the partitioning of the picture IMG_IN and the setting of the block-based scan order of the picture IMG_IN shown in FIG. 9, several exemplary data arrangements can be obtained. Please refer to FIG. 10, which is a diagram illustrating another data arrangement of luma pixels in one buffer according to the third exemplary data arrangement design of the present invention, where each of the luma pixels in the picture is divided into a first part (e.g., an MSB part) and a second part (e.g., an LSB part) stored in different storage units. In this example, one 16×32 data block is divided into a plurality of 16×4 compact units, and each 16×4 compact unit is composed of a plurality of N-bit luma pixels Y0-Y63. As mentioned above, the buffer controller 104 stores luma pixels into the buffer 102_1 having M-bit storage units. For example, the buffer 102_1 is implemented using a DRAM. In a case where M=128 and N=10, five successive DRAM words are used for storing all pixel data of the luma pixels Y0-Y63 in one 16×4 compact unit, the MSB part of each 10-bit luma pixel includes bit[2]-bit[9], and the LSB part of each 10-bit luma pixel includes bit [0] and bit [1]. Based on the block-based scan order (which includes a raster-scan order for MSB parts in each compact unit and a vertical scan order for LSB parts in each compact unit), 2-bit LSB parts of luma pixels Y0, Y16, Y32, Y48 . . . Y15, Y31, Y47, Y63 are sequentially stored in DRAM word 0, 8-bit MSB parts of luma pixels Y0-Y15 are sequentially stored in DRAM word 1, 8-bit MSB parts of luma pixels Y16-Y31 are sequentially stored in DRAM word 2, 8-bit MSB parts of luma pixels Y32-Y47 are sequentially stored in DRAM word 3, and 8-bit MSB parts of luma pixels Y48-Y63 are sequentially stored in DRAM word 4.

Figure 11:
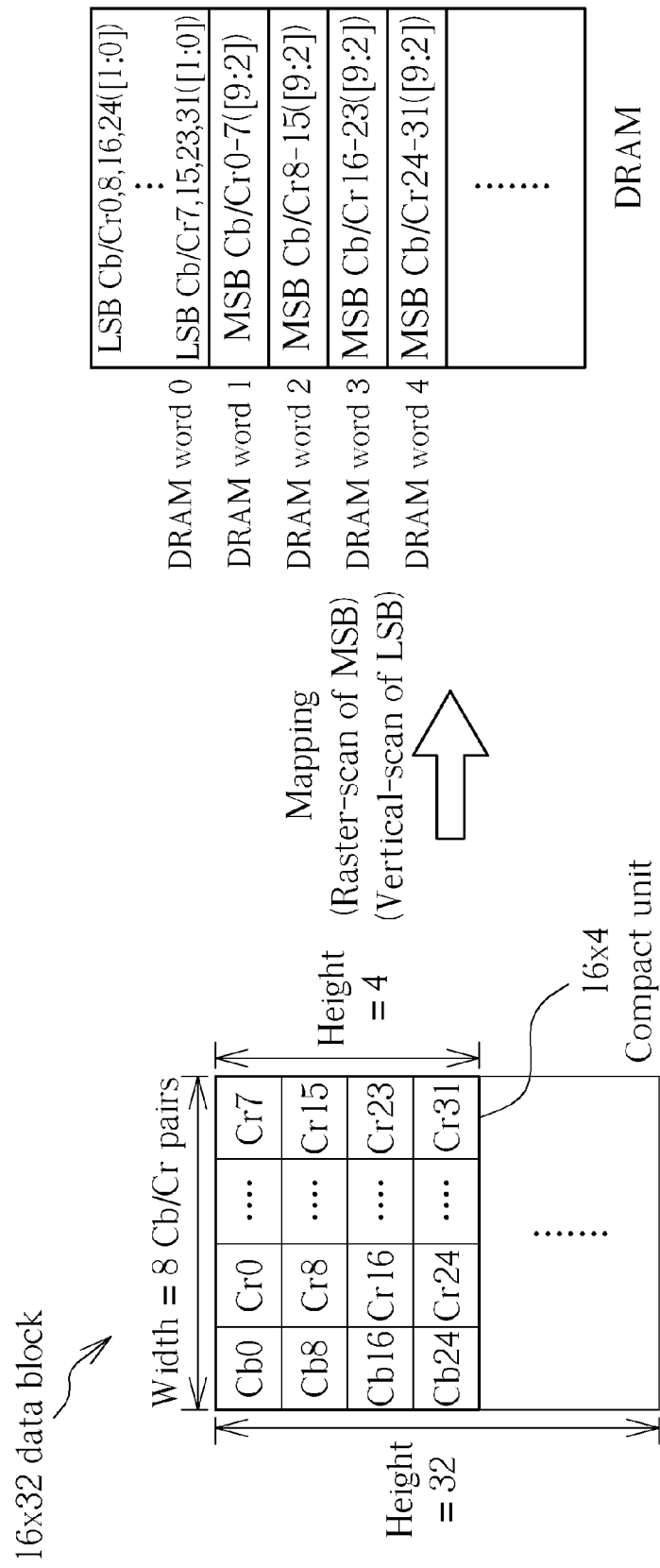
FIG. 11 is a diagram illustrating another data arrangement of chroma pixels of different chrominance components in one buffer according to the third exemplary data arrangement design of the present invention.

Please refer to FIG. 11, which is a diagram illustrating another data arrangement of chroma pixels of different chrominance components in one buffer according to the third exemplary data arrangement design of the present invention, where each of the chroma pixels in the picture is divided into a first part (e.g., an MSB part) and a second part (e.g., an LSB part) stored in different storage units. In this example, one 16×32 data block is divided into a plurality of 16×4 compact units, and each 16×4 compact unit is composed of a plurality of 2N-bit chroma pixel pairs (Cb0, Cr0), (Cb1, Cr1) . . . (Cb31, Cr31). As mentioned above, the buffer controller 104 stores chroma pixels of different chrominance components (Cb, Cr) into the same buffer 102_2 having M-bit storage units. For example, the buffer 102_2 is implemented using a DRAM. In a case where M=128 and N=10, five successive DRAM words are used for storing all pixel data of the chroma pixels Cb0-Cb31 and Cr0-Cr31 in one 16×4 compact unit, the MSB part of each 10-bit chroma pixel includes bit [2]-bit [9], and the LSB part of each 10-bit chroma pixel includes bit [0] and bit[1]. Based on the block-based scan order (which includes a raster-scan order for MSB parts in each compact unit and a vertical scan order for LSB parts in each compact unit), 2-bit LSB parts of chroma pixels Cb0, Cb8, Cb16, Cb24, Cr0, Cr8, Cr16, Cr24 . . . Cb7, Cb15, Cb23, Cb31, Cr7, Cr15, Cr23, Cr31 are sequentially stored in DRAM word 0, 8-bit MSB parts of chroma pixels Cb0, Cr0 . . . Cb7, Cr7 are sequentially stored in DRAM word 1, 8-bit MSB parts of chroma pixels Cb8, Cr8 . . . Cb15, Cr15 are sequentially stored in DRAM word 2, 8-bit MSB parts of chroma pixels Cb16, Cr16 . . . Cb23, Cr23 are sequentially stored in DRAM word 3, and 8-bit MSB parts of chroma pixels Cb24, Cr24 . . . Cb31, Cr31 are sequentially stored in DRAM word 4.

In each of first exemplary data arrangement design (FIG. 2-FIG. 4), second exemplary data arrangement design (FIG. 5), and third exemplary data arrangement design (FIG. 7-FIG. 8 & FIG. 10-FIG. 11), part or all of the M-bit storage units are filled with pixel data bits derived from N-bit pixels. The present invention further proposes a fourth exemplary data arrangement design which ensures that each used M-bit storage unit stores an integer number of N-bit pixels without any fractional N-bit pixel. That is, each M-bit storage unit is not fully used to store pixel data bits, and has unused bits at pre-defined locations. The pre-defined locations are allowed to be distributed in an M-bit storage unit. In one exemplary design of the present invention, the unused bits are all allocated at the end of each M-bit storage unit.

In one exemplary implementation of the fourth exemplary data arrangement design of the present invention, the buffer controller 104 is configured for continuously storing pixel data of N-bit pixels into one M-bit storage unit of a buffer, until the M-bit storage unit does not have enough unused bits for fully storing one more N-bit pixel. Please refer to FIG. 12, which is a diagram illustrating a data arrangement of luma pixels in one buffer according to the fourth exemplary data arrangement design of the present invention, where each used M-bit storage unit stores an integer number of N-bit pixels without any fractional N-bit pixel. As mentioned above, the buffer controller 104 stores luma pixels in the buffer 102_1. Each of the luma pixels in the picture IMG_IN has N bits, and each of the storage units in the buffer 102_1 has M bits. For example, N=10 and M=128.

Figure 12:
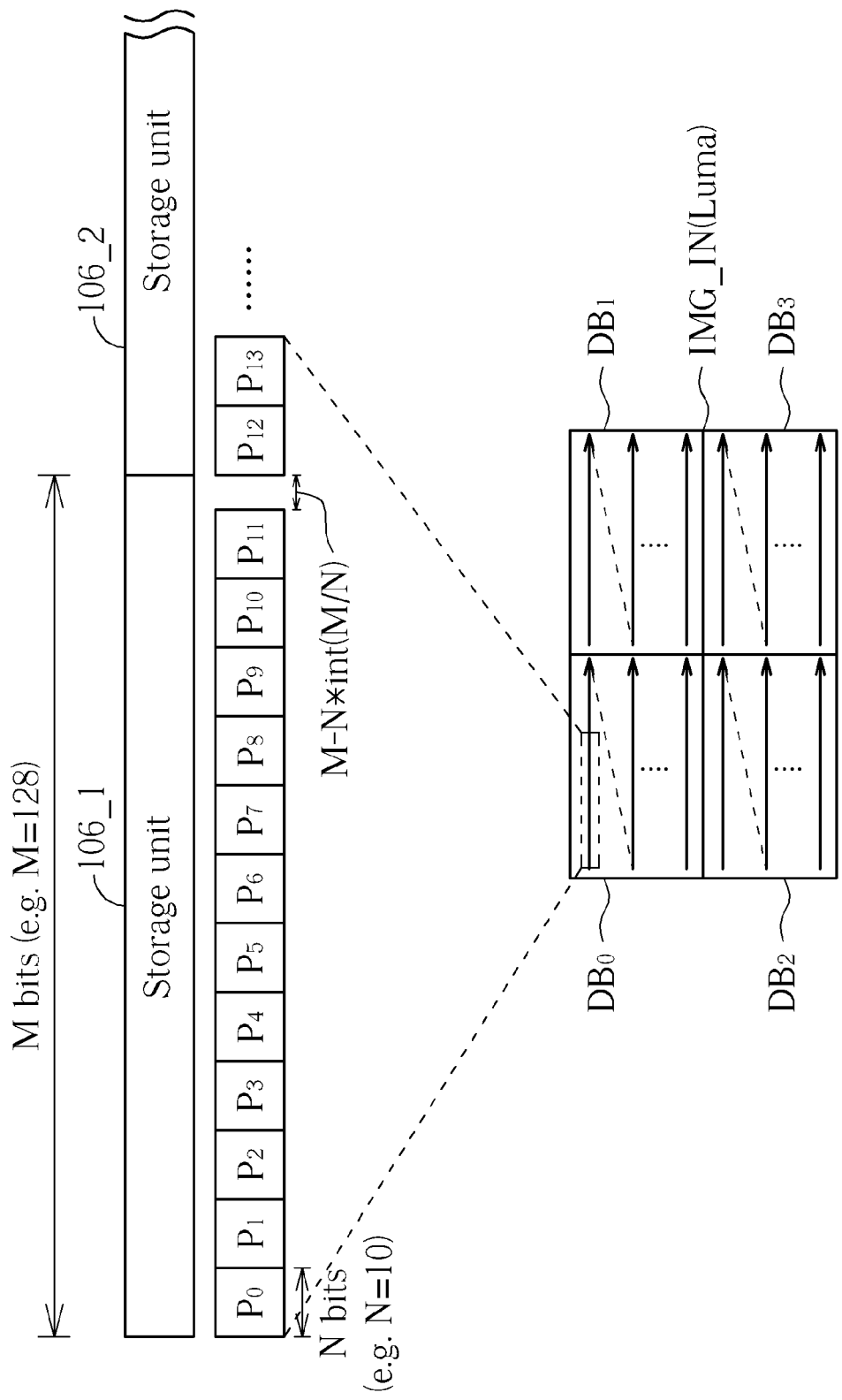
FIG. 12 is a diagram illustrating a data arrangement of luma pixels in one buffer according to the fourth exemplary data arrangement design of the present invention.

Since M is not divisible by N, the size of one storage unit (e.g., a 128-bit DRAM word) is not equal to an accumulated size of an integer number of luma pixels. As shown in FIG. 12, the picture IMG_IN has a plurality of data blocks (e.g., $DB_0$, $DB_1$, $DB_2$, $DB_3$, each composed of a plurality of luma pixels). It should be noted that the number of data blocks defined in the picture IMG_IN in FIG. 12 is for illustrative purposes only, and is not meant to be a limitation of the present invention. The block-based scan order of the picture IMG_IN in FIG. 12 includes a raster scan order for the data blocks in the picture IMG_IN (e.g., $DB_0 \rightarrow DB_1 \rightarrow DB_2 \rightarrow DB_3$), and a raster-scan order for N-bit luma pixels in each data block. When the number of luma pixels stored into the current storage unit 106_1 reaches int (M/N), the remaining storage space in the current storage unit 106_1 is smaller than the size of one luma pixel. Specifically, supposing that the color format of the picture IMG_IN is 4:2:0, when 12 luma pixels $P_0$-$P_{11}$, each having 10 bits, are stored into the 128-bit storage unit 106_1, the remaining storage space in the 128-bit storage unit 106_1 only has 8 bits (i.e., M−N*int (M/N)=8) which are not enough for fully storing one more 10-bit luma pixel. In this embodiment, the following unused bits of the storage unit 106_1 are left empty. In other words, the remaining storage space in the storage unit 106_1 may be regarded as having don't care bits stored therein. Since pixel data of luma pixels in the picture IMG_IN are stored in the buffer 102_1 based on the aforementioned block-based scan order and the remaining storage space in the current storage unit 106_1 is not used for storing pixel data, the buffer controller 104 therefore stores the next luma pixel $P_{12}$ in the next storage unit 106_2.

Figure 13:
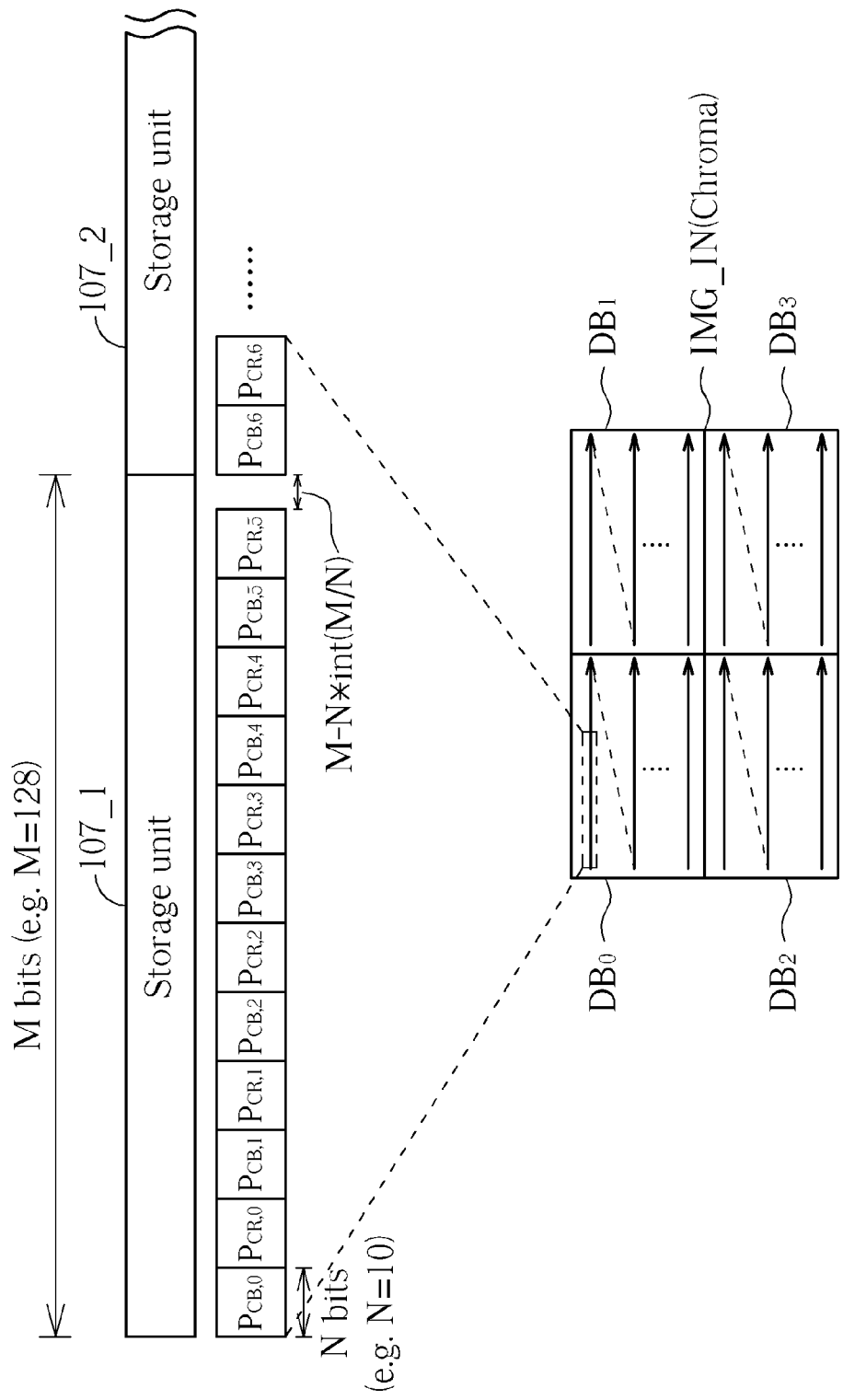
FIG. 13 is a diagram illustrating a data arrangement of chroma pixels of different chrominance components in one buffer according to the fourth exemplary data arrangement design of the present invention.

Please refer to FIG. 13, which is a diagram illustrating a data arrangement of chroma pixels of different chrominance components in one buffer according to the fourth exemplary data arrangement design of the present invention, where each used M-bit storage unit stores an integer number of N-bit pixels without any fractional N-bit pixel. As mentioned above, the buffer controller 104 stores chroma pixels corresponding to different chrominance components (Cb, Cr) in the same buffer 102_2, where chroma pixels of one chrominance component (Cb) and chroma pixels of another chrominance component (Cr) are stored in an interleaved arrangement such as Cb-Cr-Cb-Cr or Cr-Cb-Cr-Cb. Each of the chroma pixels in the picture IMG_IN has N bits, and each of the storage units in the buffer 102_2 has M bits. For example, N=10 and M=128. Since M is not divisible by N, the size of one storage unit (e.g., a 128-bit DRAM word) is not equal to an accumulated size of an integer number of chroma pixels. As shown in FIG. 13, the picture IMG_IN has a plurality of data blocks (e.g., $DB_0$, $DB_1$, $DB_2$, $DB_3$, each composed of a plurality of chroma pixels of different chrominance components). It should be noted that the number of data blocks defined in the picture IMG_IN in FIG. 13 is for illustrative purposes only, and is not meant to be a limitation of the present invention. The block-based scan order of the picture IMG_IN in FIG. 13 includes a raster scan order for the data blocks in the picture IMG_IN (e.g., $DB_0 \rightarrow DB_1 \rightarrow DB_2 \rightarrow DB_3$), and a raster-scan order for N-bit chroma pixels in each data block. When the number of chroma pixels stored into the current storage unit 107_1 reaches int (M/N), the remaining storage space in the current storage unit 107_1 is smaller than the size of one chroma pixel. Specifically, supposing that the color format of the picture IMG_IN is 4:2:0, when 12 chroma pixels $P_{CB, 0}$, $P_{CR, 0}$, $P_{CB, 1}$, $P_{CR, 1}$ ... $P_{CB, 5}$, $P_{CR, 5}$, each having 10 bits, are stored into the 128-bit storage unit 107_1, the remaining storage space in the 128-bit storage unit 107_1 only has 8 bits (i.e., M−N*int (M/N)=8) which are not enough for fully storing one more 10-bit chroma pixel. In this embodiment, the unused bits of the storage unit 107_1 are left empty. Since pixel data of chroma pixels of each chrominance component in the picture IMG_IN are stored in the aforementioned block-based scan order and the remaining storage space of the storage unit 107_1 is not used for storing pixel data, the next chroma pixel $P_{CB, 6}$ is stored in the next storage unit 107_2.

Figure 14:
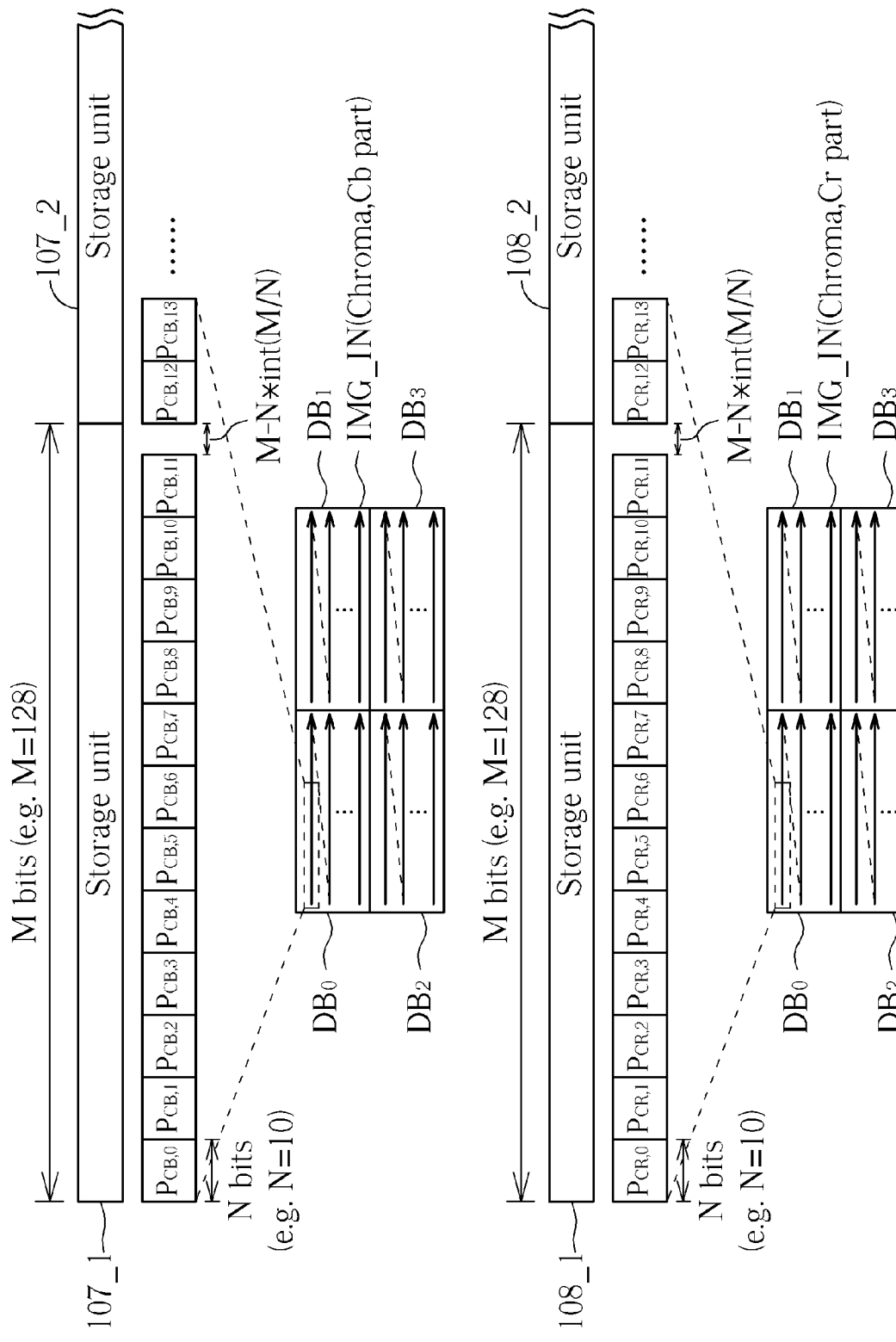
FIG. 14 is a diagram illustrating a data arrangement of chroma pixels of one chrominance component in one buffer and chroma pixels of another chrominance component in another buffer according to the fourth exemplary data arrangement design of the present invention.

Please refer to FIG. 14, which is a diagram illustrating a data arrangement of chroma pixels of one chrominance component in one buffer and chroma pixels of another chrominance component in another buffer according to the fourth exemplary data arrangement design of the present invention, where each used M-bit storage unit stores an integer number of N-bit pixels without any fractional N-bit pixel. As mentioned above, the buffer controller 104 stores chroma pixels corresponding to one chrominance component (Cb) in the buffer 102_2, and stores chroma pixels corresponding to another chrominance component (Cr) in the buffer 102_3. Each of the chroma pixels in the picture IMG_IN has N bits, and each of the storage units in the buffers 102_2 and 102_3 has M bits. For example, N=10 and M=128. Since M is not divisible by N, the size of one storage unit (e.g., a 128-bit DRAM word) is not equal to an accumulated size of an integer number of chroma pixels.

As shown in FIG. 14, when the number of chroma pixels of the chrominance component Cb stored into the current storage unit 107_1 reaches int (M/N), the remaining storage space in the current storage unit 107_1 is smaller than the size of one chroma pixel of the chrominance component Cb. Specifically, supposing that the color format of the picture IMG_IN is 4:4:4, when 12 chroma pixels $P_{CB, 0}$-$P_{CB, 11}$, each having 10 bits, are stored into the 128-bit storage unit 107_1, the remaining storage space in the 128-bit storage unit 107_1 only has 8 bits (i.e., M−N*int (M/N)=8) which are not enough for fully storing one more 10-bit chroma pixel of the chrominance component Cb. In this embodiment, the unused bits of the storage unit 107_1 are left empty. Since pixel data of chroma pixels of the chrominance component Cb are stored in the aforementioned block-based scan order and the remaining storage space is not used for storing pixel data, the next chroma pixel $P_{CB, 12}$ is stored in the next storage unit 107_2.

Similarly, as shown in FIG. 14, when the number of chroma pixels of the chrominance component Cr stored into the current storage unit 108_1 reaches int (M/N), the remaining storage space in the current storage unit 108_1 is smaller than the size of one chroma pixel of the chrominance component Cr. Specifically, supposing that the color format of the picture IMG_IN is 4:4:4, when 12 chroma pixels $P_{CR, 0}$-$P_{CR, 11}$, each having 10 bits, are stored into the 128-bit storage unit 108_1, the remaining storage space in the 128-bit storage unit 108_1 only has 8 bits (i.e., M−N*int (M/N)=8) which are not enough for fully storing one more 10-bit chroma pixel of the chrominance component Cr. In this embodiment, the unused bits of the storage unit 108_1 are left empty. Since pixel data of chroma pixels of the chrominance component Cr are stored in the aforementioned block-based scan order and the remaining storage space is not used for storing pixel data, the next chroma pixel $P_{CR, 12}$ is stored in the next storage unit 108_2.

In accordance with the fourth exemplary data arrangement design (FIG. 12-FIG. 14), all of the N-bit pixels (e.g., luma pixels or chroma pixels) in the picture IMG_IN are stored in M-bit storage units according to a specific block-based scan order including a raster-scan order for data blocks in the picture and a raster-scan order for pixels in each data block. However, the partitioning of the picture IMG_IN and/or the setting of the block-based scan order of the picture IMG_IN can be adjusted, thus resulting in a different data arrangement design. Hence, the present invention further proposes a fifth exemplary data arrangement design which makes each used M-bit storage unit store all N-bit pixels of only one basic block in a data block of the picture IMG_IN without any fractional N-bit pixel.

Figure 15:
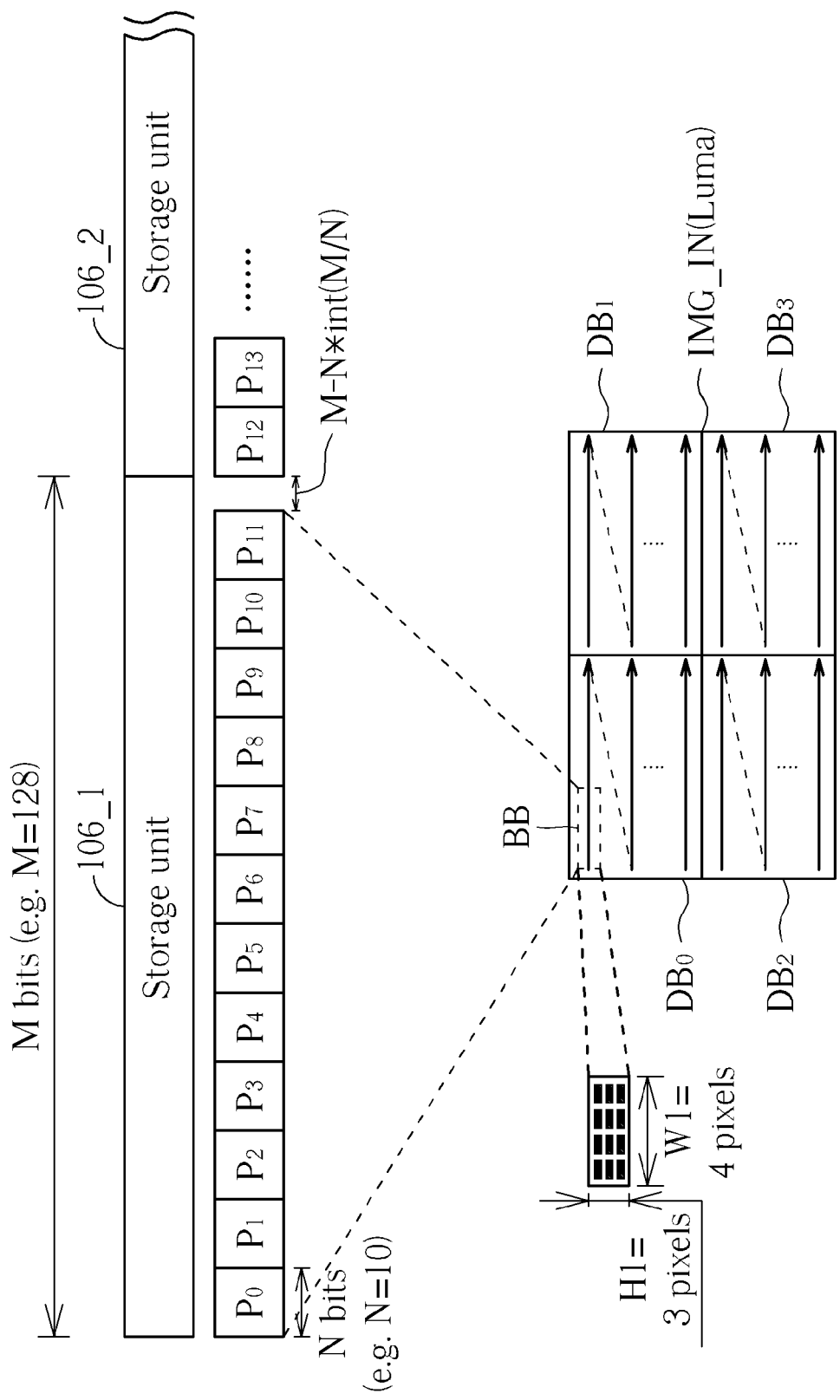
FIG. 15 is a diagram illustrating a data arrangement of luma pixels in one buffer according to the fifth exemplary data arrangement design of the present invention.

Please refer to FIG. 15, which is a diagram illustrating a data arrangement of luma pixels in one buffer according to the fifth exemplary data arrangement design of the present invention, where each used M-bit storage unit stores all N-bit pixels of only one basic block in a data block of the picture IMG_IN without any fractional N-bit pixel. As mentioned above, the buffer controller 104 stores luma pixels in the buffer 102_1. Each of the luma pixels in the picture IMG_IN has N bits, and each of the storage units in the buffer 102_1 has M bits. For example, N=10 and M=128. Since M is not divisible by N, the size of one storage unit (e.g., a 128-bit DRAM word) is not equal to an accumulated size of an integer number of luma pixels. As shown in FIG. 15, the picture IMG_IN has a plurality of data blocks (e.g., $DB_0$, $DB_1$, $DB_2$, $DB_3$), each of the data blocks includes a plurality of basic blocks, and each basic block BB is a W1×H1 pixel block such as a 4×3 pixel block. By way of example, but not limitation, each data block may include K basic block rows, and each basic block row may include J basic blocks, where J is divisible by W1 and K is divisible by H1. The block-based scan order of the picture IMG_IN in FIG. 15 includes a raster scan order for the data blocks in the picture IMG_IN (e.g., $DB_0 \rightarrow DB_1 \rightarrow DB_2 \rightarrow DB_3$), a raster-scan order for basic blocks in each data block, and a raster scan order for luma pixels in each basic block. As shown in FIG. 15, supposing that the color format of the picture IMG_IN is 4:2:0, all luma pixels $P_0$-$P_{11}$ of one basic block are sequentially stored in the same storage unit 106_1 based on the raster scan order for luma pixels in the basic block, and the following unused 8 bits (i.e., M−N*int (M/N)=8) are left empty. Since the current storage unit 106_1 only stores pixel data of luma pixels $P_0$-$P_{11}$ in a current basic block and the remaining storage space in the current storage unit 106_1 is not used for storing pixel data, the buffer controller 104 therefore stores pixel data of all luma pixels of a next basic block in the next storage unit 106_2.

Figure 16:
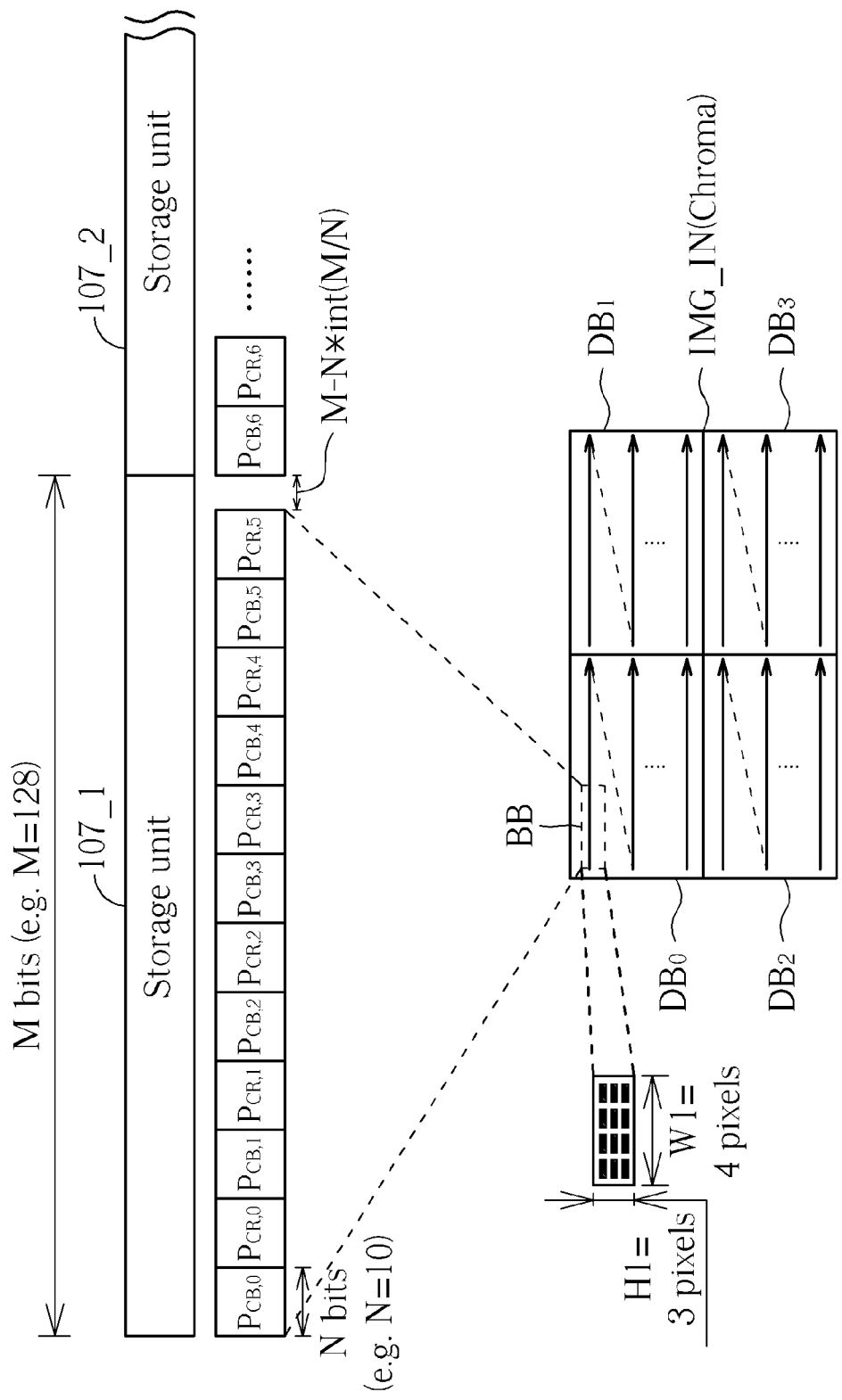
FIG. 16 is a diagram illustrating a data arrangement of chroma pixels of different chrominance components in one buffer according to the fifth exemplary data arrangement design of the present invention.

Please refer to FIG. 16, which is a diagram illustrating a data arrangement of chroma pixels of different chrominance components in one buffer according to the fifth exemplary data arrangement design of the present invention, where each used M-bit storage unit stores all N-bit pixels of only one basic block in a data block of the picture IMG_IN without any fractional N-bit pixel. As mentioned above, the buffer controller 104 stores chroma pixels corresponding to different chrominance components (Cb, Cr) in the same buffer 102_2, where chroma pixels of one chrominance component (Cb) and chroma pixels of another chrominance component (Cr) are stored in an interleaved arrangement such as Cb-Cr-Cb-Cr or Cr-Cb-Cr-Cb. Each of the chroma pixels in the picture IMG_IN has N bits, and each of the storage units in the buffer 102_2 has M bits. For example, N=10 and M=128. Since M is not divisible by N, the size of one storage unit (e.g., a 128-bit DRAM word) is not equal to an accumulated size of an integer number of chroma pixels. As shown in FIG. 16, the picture IMG_IN has a plurality of data blocks (e.g., $DB_0$, $DB_1$, $DB_2$, $DB_3$), each of the data blocks includes a plurality of basic blocks, and each basic block BB is a W1×H1 pixel block such as a 4×3 pixel block. By way of example, but not limitation, each data block may include K basic block rows, and each basic block row may include J basic blocks, where J is divisible by W1 and K is divisible by H1. The block-based scan order of the picture IMG_IN in FIG. 16 includes a raster scan order for the data blocks in the picture IMG_IN (e.g., $DB_0 \rightarrow DB_1 \rightarrow DB_2 \rightarrow DB_3$), a raster-scan order for basic blocks in each data block, and a raster scan order for chroma pixels in each basic block. As shown in FIG. 16, supposing that the color format of the picture IMG_IN is 4:2:0, all chroma pixels $P_{CB, 0}$, $P_{CR, 0}$, $P_{CB, 1}$, $P_{CR, 1}$ ... $P_{CB, 5}$, $P_{CR, 5}$ of one basic block are sequentially stored in the same storage unit 107_1 based on the raster scan order for chroma pixels in the basic block, and the following unused 8 bits (i.e., M−N*int (M/N)=8) are left empty. Since the current storage unit 107_1 only stores pixel data of chroma pixels $P_{CB, 0}$, $P_{CR, 0}$, $P_{CB, 1}$, $P_{CR, 1}$ ... $P_{CB, 5}$, $P_{CR, 5}$ in a current basic block and the remaining storage space in the current storage unit 107_1 is not used for storing pixel data, the buffer controller 104 therefore stores pixel data of all chroma pixels of a next basic block in the next storage unit 107_2.

Figure 17:
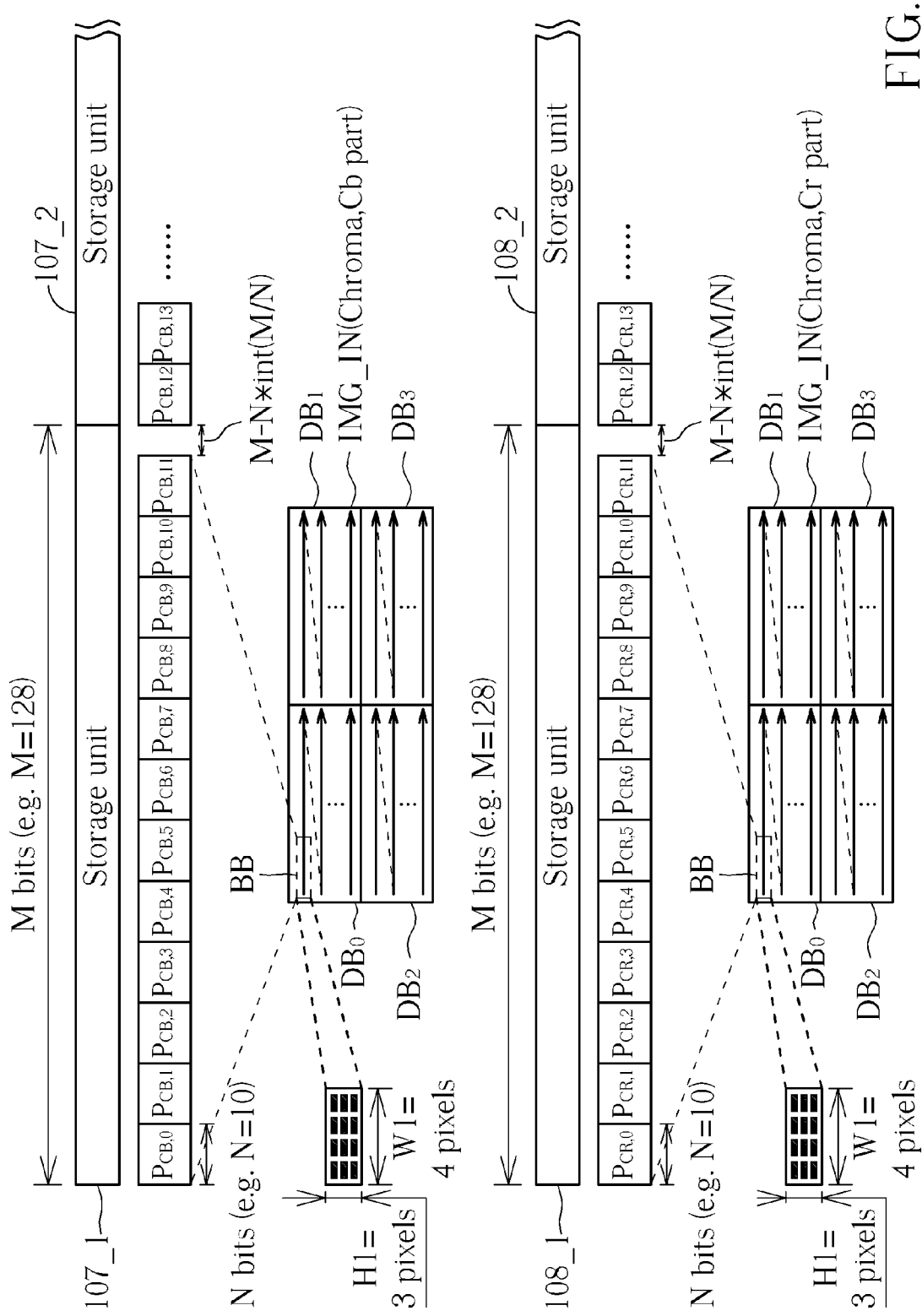
FIG. 17 is a diagram illustrating a data arrangement of chroma pixels of one chrominance component in one buffer and chroma pixels of another chrominance component in another buffer according to the fifth exemplary data arrangement design of the present invention.

Please refer to FIG. 17, which is a diagram illustrating a data arrangement of chroma pixels of one chrominance component in one buffer and chroma pixels of another chrominance component in another buffer according to the fifth exemplary data arrangement design of the present invention, where each used M-bit storage unit stores all N-bit pixels of only one basic block in a data block of the picture IMG_IN without any fractional N-bit pixel. As mentioned above, the buffer controller 104 stores chroma pixels corresponding to one chrominance component (Cb) in the buffer 102_2, and stores chroma pixels corresponding to another chrominance component (Cr) in the buffer 102_3. Each of the chroma pixels in the picture IMG_IN has N bits, and each of the storage units in the buffers 102_2 and 102_3 has M bits. For example, N=10 and M=128. Since M is not divisible by N, the size of one storage unit (e.g., a 128-bit DRAM word) is not equal to an accumulated size of an integer number of chroma pixels.

As shown in FIG. 17, the picture IMG_IN has a plurality of data blocks (e.g., $DB_0$, $DB_1$, $DB_2$, $DB_3$), each of the data blocks includes a plurality of basic blocks, and each basic block BB is a W1×H1 pixel block such as a 4×3 pixel block. By way of example, but not limitation, each data block may include K basic block rows, and each basic block row may include J basic blocks, where J is divisible by W1 and K is divisible by H1. The block-based scan order of the picture IMG_IN in FIG. 17 includes a raster scan order for the data blocks in the picture IMG_IN (e.g., $DB_0 \rightarrow DB_1 \rightarrow DB_2 \rightarrow DB_3$), a raster-scan order for basic blocks in each data block, and a raster scan order for chroma pixels of each chrominance component in each basic block.

Specifically, supposing that the color format of the picture IMG_IN is 4:4:4, all chroma pixels $P_{CB, 0}$-$P_{CB, 11}$ of one basic block are sequentially stored in the same storage unit 107_1 based on the raster scan order for chroma pixels of the chrominance component Cb in the basic block, and the following unused 8 bits (i.e., M−N*int (M/N)=8) are left empty. Since the current storage unit 107_1 only stores pixel data of chroma pixels $P_{CB, 0}$-$P_{CB, 11}$ of the chrominance component Cb in a current basic block and the remaining storage space in the current storage unit 107_1 is not used for storing pixel data, the buffer controller 104 therefore stores pixel data of all chroma pixels of the chrominance component Cb of a next basic block in the next storage unit

107_2. Similarly, all chroma pixels $P_{CR,0}$-$P_{CR,11}$ of one basic block are sequentially stored in the same storage unit 108_1 based on the raster scan order for chroma pixels of the chrominance component Cr in the basic block, and the following unused 8 bits (i.e., M−N*int (M/N)=8) are left empty. Since the current storage unit 108_1 only stores pixel data of chroma pixels $P_{CR,0}$-$P_{CR,11}$ of the chrominance component Cr in a current basic block and the remaining storage space in the current storage unit 108_1 is not used for storing pixel data, the buffer controller 104 therefore stores pixel data of all chroma pixels of the chrominance component Cr of a next basic block in the next storage unit 108_2.

In the exemplary data arrangements shown in FIG. 12-FIG. 14, the luma pixels are stored in one buffer 102_1, and the chroma pixels are stored in one buffer 102_2 (if different chrominance components are stored in the same buffer) or two buffers 102_2, 102_3 (if different chrominance components are stored in different buffers, respectively). In an alternative design, the luma pixels and the chroma pixels may be stored in the same buffer. For example, in a sixth exemplary data arrangement design obtained by modifying the aforementioned fourth exemplary data arrangement design in FIG. 12-FIG. 14 (which defines that each used M-bit storage unit stores an integer number of N-bit pixels without any fractional N-bit pixel), the buffer controller 104 is configured for storing N-bit luma pixels and N-bit chroma pixels into one M-bit storage unit of a buffer (e.g., 102_1), where each used M-bit storage unit stores an integer number of N-bit luma pixels without fractional N-bit luma pixel, and further stores an integer number of N-bit chroma pixels without fractional N-bit chroma pixel.

Figure 18:
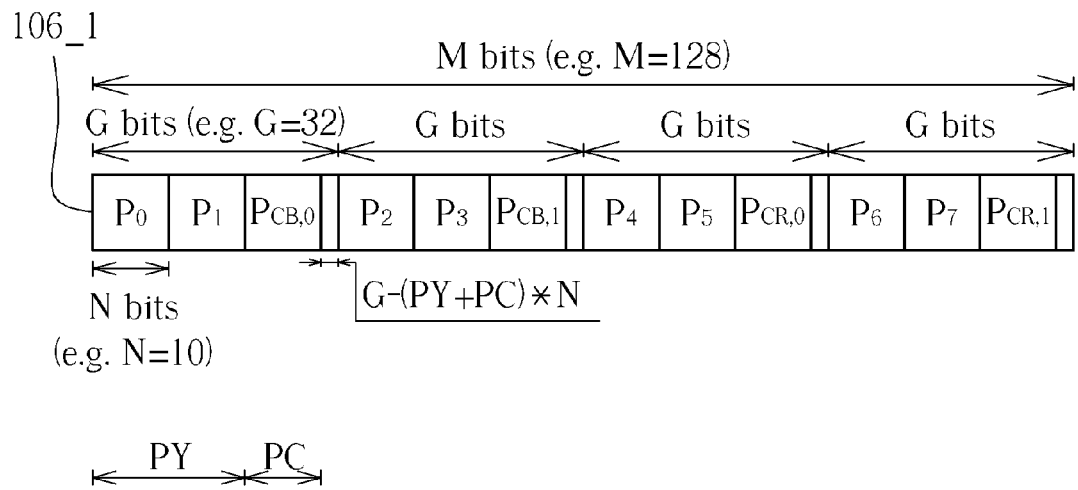
FIG. 18 is a diagram illustrating a first data arrangement of luma pixels and chroma pixels in the same buffer according to the sixth exemplary data arrangement design of the present invention.

Please refer to FIG. 18, which is a diagram illustrating a first data arrangement of luma pixels and chroma pixels in the same buffer according to the sixth exemplary data arrangement design of the present invention. Specifically, a luma-chroma interleaved data arrangement is employed for each storage unit in a buffer. As shown in FIG. 18, one M-bit storage unit is evenly divided into a plurality of grid units each having G bits. For example, M=128, N=10, and G=32. Since M is not divisible by N, the size of one storage unit (e.g., a 128-bit DRAM word) is not equal to an accumulated size of an integer number of N-bit pixels, and the size of one grid unit (e.g., one-fourth of a 128-bit DRAM word) is also not equal to an accumulated size of an integer number of N-bit pixels. Based on the luma-chroma interleaved data arrangement, each of the used G-bit grid units has at least one N-bit luma pixel and at least one N-bit chroma pixel stored therein. For example, each G-bit grid unit can store PY N-bit luma pixels and PC N-bit chroma pixels. Hence, (PY+PC)*N bits in the G-bit grid unit are used to store pixel data bits. Regarding the remaining storage space (i.e., G−(PY+PC)*N bits), it is not used to store pixel data bits, where these (G−(PY+PC)*N) unused bits are allocated in pre-defined locations of the grid unit. The pre-defined locations are allowed to be distributed in a grid unit. In one embodiment, these (G−(PY+PC)*N) unused bits are allocated at the end of each grid unit. As shown in FIG. 18, supposing that the color format of the picture IMG_IN is 4:2:0, the luma pixels $P_0$-$P_7$ are successively obtained from the picture IMG_IN according to a block-based scan order of the picture IMG_IN (e.g., the exemplary block-based scan order shown in FIG. 12-FIG. 14); the chroma pixels $P_{CB,0}$ and $P_{CB,1}$ of one chrominance component Cb are successively obtained from the picture IMG_IN according to the block-based scan order; and the chroma pixels $P_{CR,0}$ and $P_{CR,1}$ of another chrominance component Cr are successively obtained from the picture IMG_IN according to the block-based scan order. In this embodiment, PY=2 and PC=1. Hence, two luma pixels and one chroma pixel are stored in each grid unit based on the block-based scan order (which includes a raster-scan order for data blocks and a raster-scan order for pixels in each data block). As shown in FIG. 18, the $1^{st}$ grid unit of the storage unit 106_1 stores luma pixels $P_0$, $P_1$ and chroma pixel $P_{CB,0}$, and has the remaining storage space with 2 bits (i.e., G−(PY+PC)*N=2) left empty; the $2^{nd}$ grid unit of the storage unit 106_1 stores luma pixels $P_2$, $P_3$ and chroma pixel $P_{CB,1}$, and has the remaining storage space with 2 bits left empty; the $3^{rd}$ grid unit of the storage unit 106_1 stores luma pixels $P_4$, $P_5$ and chroma pixel $P_{CR,0}$, and has the remaining storage space with 2 bits left empty; and the $4^{th}$ grid unit of the storage unit 106_1 stores luma pixels $P_6$, $P_7$ and chroma pixel $P_{CR,1}$, and has the remaining storage space with 2 bits left empty. If the luma-chroma interleaved data arrangement shown in FIG. 18 is employed, only one luma-chroma single buffer (e.g., 102_1) is needed in the buffer device 101.

The interleaving manner of luma pixels and chroma pixels shown in FIG. 18 is for illustrative purposes only, and is not meant to be a limitation of the present invention. Other interleaving manners of luma pixels and chroma pixels are illustrated in FIG. 19, FIG. 20 and FIG. 21, respectively.

Figure 19:
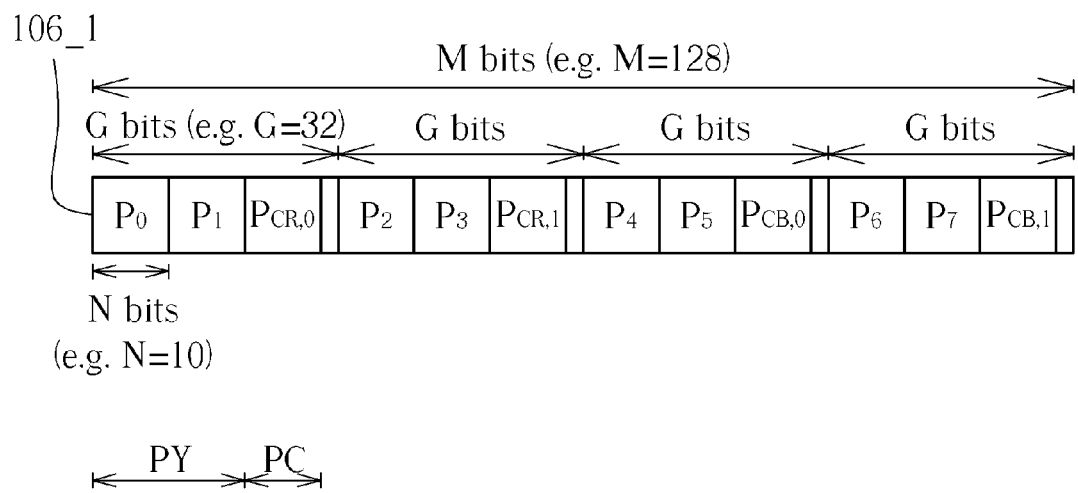
FIG. 19 is a diagram illustrating a second data arrangement of luma pixels and chroma pixels in the same buffer according to the sixth exemplary data arrangement design of the present invention.

Please refer to FIG. 19, which is a diagram illustrating a second data arrangement of luma pixels and chroma pixels in the same buffer according to the sixth exemplary data arrangement design of the present invention. The luma-chroma interleaved data arrangement in FIG. 19 is similar to that in FIG. 18, and the major difference is the storage order of the chroma pixels. As shown in FIG. 19, the $1^{St}$ 1 grid unit of the storage unit stores luma pixels $P_0$, $P_1$ and chroma pixel $P_{CR,0}$, and has the remaining storage space with 2 bits (i.e., G−(PY+PC)*N=2) left empty; the $2^{nd}$ grid unit of the storage unit stores luma pixels $P_2$, $P_3$ and chroma pixel $P_{CR,1}$, and has the remaining storage space with 2 bits left empty; the $3^{rd}$ grid unit of the storage unit stores luma pixels $P_4$, $P_5$ and chroma pixel $P_{CB,0}$, and has the remaining storage space with 2 bits left empty; and the $4^{th}$ grid unit of the storage unit stores luma pixels $P_6$, $P_7$ and chroma pixel $P_{CB,1}$, and has the remaining storage space with 2 bits left empty.

Figure 20:
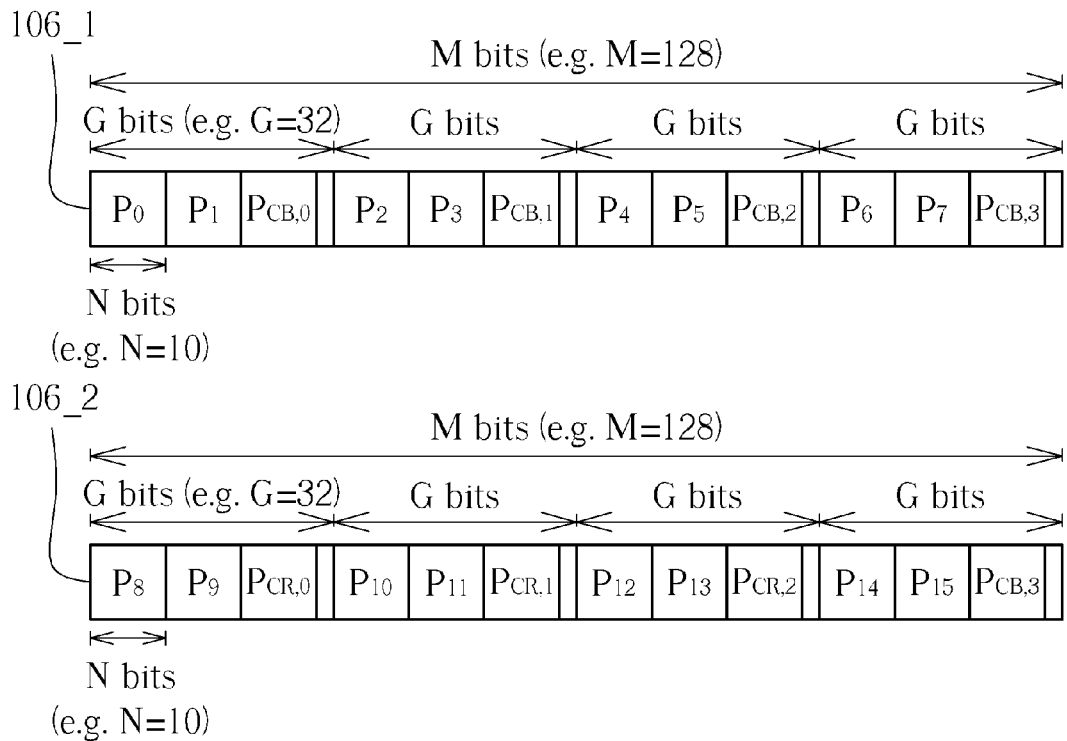
FIG. 20 is a diagram illustrating a third data arrangement of luma pixels and chroma pixels in the same buffer according to the sixth exemplary data arrangement design of the present invention.

Please refer to FIG. 20, which is a diagram illustrating a third data arrangement of luma pixels and chroma pixels in the same buffer according to the sixth exemplary data arrangement design of the present invention. As shown in FIG. 20, one M-bit storage unit is evenly divided into a plurality of grid units each having G bits. For example, M=128, N=10, and G=32. Besides, each G-bit grid unit can store PY N-bit luma pixels and PC N-bit chroma pixels. For example, PY=2 and PC=1. Specifically, supposing that the color format of the picture IMG_IN is 4:2:0, the luma pixels $P_0$-$P_{15}$ are successively obtained from the picture IMG_IN according to a block-based scan order of the picture IMG_IN (e.g., the exemplary block-based scan order shown in FIG. 12-FIG. 14); the chroma pixels $P_{CB,0}$-$P_{CB,3}$ of one chrominance component Cb are successively obtained from the picture IMG_IN according to the block-based scan order; and the chroma pixels $P_{CR,0}$-$P_{CR,3}$ of another chrominance component Cr are successively obtained from the picture IMG_IN according to the block-based scan order. Regarding the storage unit 106_1, the $1^{st}$ grid unit stores luma pixels $P_0$, $P_1$ and chroma pixel $P_{CB,0}$, and has the remaining storage space with 2 bits left empty; the $2^{nd}$ grid unit stores luma pixels $P_2$, $P_3$ and chroma pixel $P_{CB,1}$, and has the remaining storage space with 2 bits left empty; the $3^{rd}$ grid unit stores luma pixels $P_4$, $P_5$ and chroma pixel $P_{CB, 2}$, and has the remaining storage space with 2 bits left empty; and the $4^{th}$ grid unit stores luma pixels $P_6$, $P_7$ and chroma pixel $P_{CB, 3}$, and has the remaining storage space with 2 bits left empty. Regarding the next storage unit 106_2, the $1^{st}$ grid unit stores luma pixels $P_8$, $P_9$ and chroma pixel $P_{CR, 0}$, and has the remaining storage space with 2 bits left empty; the $2^{nd}$ grid unit stores luma pixels $P_{10}$, $P_{11}$ and chroma pixel $P_{CR, 1}$, and has the remaining storage space with 2 bits left empty; the $3^{rd}$ grid unit stores luma pixels $P_{12}$, $P_{13}$ and chroma pixel $P_{CR, 2}$, and has the remaining storage space with 2 bits left empty; and the $4^{th}$ grid unit stores luma pixels $P_{14}$, $P_{15}$ and chroma pixel $P_{CR, 3}$, and has the remaining storage space with 2 bits left empty.

Figure 21:
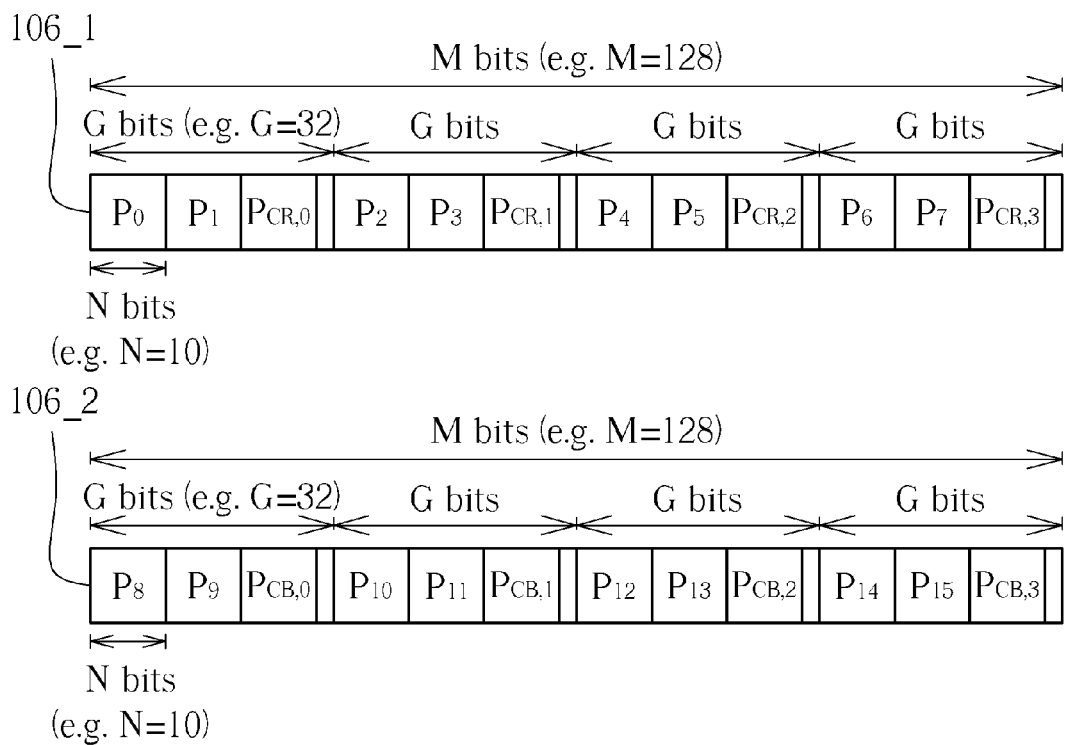
FIG. 21 is a diagram illustrating a fourth data arrangement of luma pixels and chroma pixels in the same buffer according to the sixth exemplary data arrangement design of the present invention.

Please refer to FIG. 21, which is a diagram illustrating a fourth data arrangement of luma pixels and chroma pixels in the same buffer according to the sixth exemplary data arrangement design of the present invention. The luma-chroma interleaved data arrangement in FIG. 21 is similar to that in FIG. 20, and the major difference is the storage order of the chroma pixels. As shown in FIG. 21, regarding the storage unit 106_1, the $1^{st}$ grid unit stores luma pixels $P_0$, $P_1$ and chroma pixel $P_{CR, 0}$, and has the remaining storage space with 2 bits left empty; the $2^{nd}$ grid unit stores luma pixels $P_2$, $P_3$ and chroma pixel $P_{CR, 1}$, and has the remaining storage space with 2 bits left empty; the $3^{rd}$ grid unit stores luma pixels $P_4$, $P_5$ and chroma pixel $P_{CR, 2}$, and has the remaining storage space with 2 bits left empty; and the $4^{th}$ grid unit stores luma pixels $P_6$, $P_7$ and chroma pixel $P_{CR, 3}$, and has the remaining storage space with 2 bits left empty. Regarding the next storage unit 106_2, the $1^{st}$ grid unit stores luma pixels $P_8$, $P_9$ and chroma pixel $P_{CB, 0}$, and has the remaining storage space with 2 bits left empty; the $2^{nd}$ grid unit stores luma pixels $P_{10}$, $P_{11}$ and chroma pixel $P_{CB, 1}$, and has the remaining storage space with 2 bits left empty; the $3^{rd}$ grid unit stores luma pixels $P_{12}$, $P_{13}$ and chroma pixel $P_{CB, 2}$, and has the remaining storage space with 2 bits left empty; and the $4^{th}$ grid unit stores luma pixels $P_{14}$, $P_{15}$ and chroma pixel $P_{CB, 3}$, and has the remaining storage space with 2 bits left empty.

Based on the proposed data arrangement scheme, the buffer controller 104 serves a write request $REQ_W$ by making pixel data of the picture IMG_IN stored in one or more buffers according to a block-based scan order of the picture IMG_IN, and serves a read request $REQ_R$ by reading pixel data of the picture IMG_IN from one or more buffers. For example, when the data storage apparatus 100 is implemented in a video encoder or video decoder, the write request $REQ_W$ may be used to store macroblock data of a reconstructed picture, and the read request $REQ_R$ may be used to read a prediction block for motion compensation.

Figure 22:
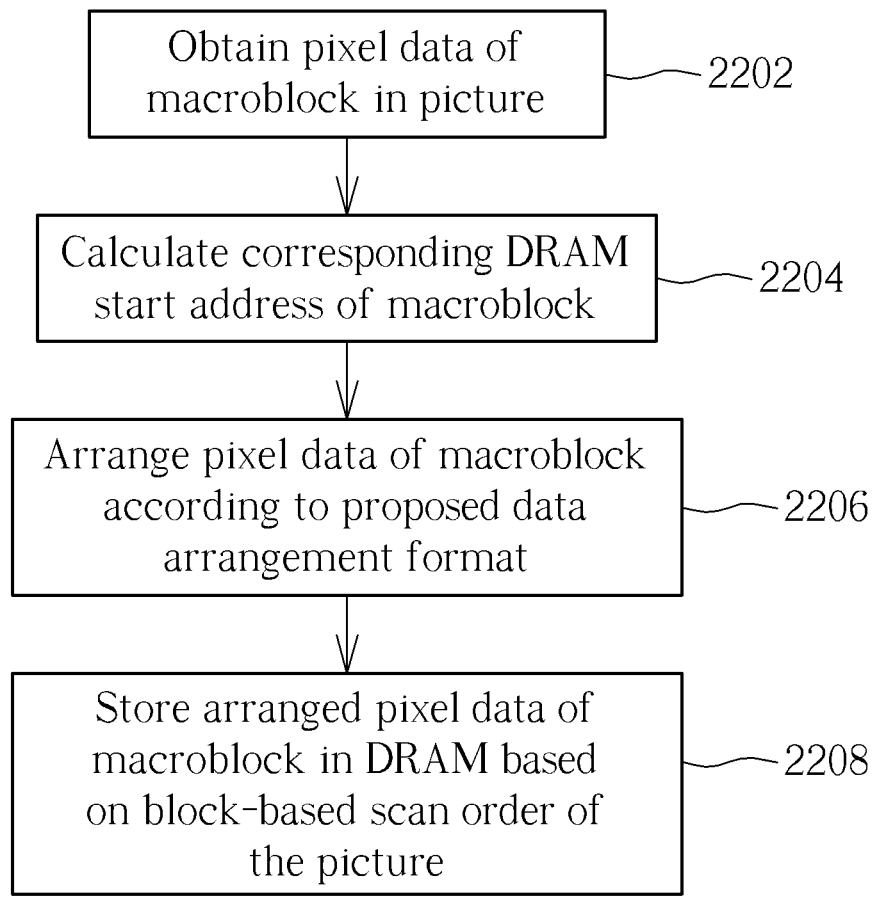
FIG. 22 is a flowchart illustrating a buffer write operation performed by the buffer controller according to an embodiment of the present invention.

FIG. 22 is a flowchart illustrating a buffer write operation performed by the buffer controller 104 according to an embodiment of the present invention. Provided that the result is substantially the same, the steps are not required to be executed in the exact order shown in FIG. 22. The buffer write operation may be applied to each macroblock of a picture. Since each macroblock includes pixel data of a plurality of partial pixel rows, the pixel data of the macroblock should be stored in adequate addresses of the DRAM such that pixel data of the picture are finally stored in the DRAM based on the desired block-based scan order of the picture and have the proposed data arrangement. The buffer write operation applied to each macroblock of the picture may be briefly summarized as below.

Step 2202: Obtain pixel data of a macroblock in a picture.

Step 2204: Calculate a corresponding DRAM start address (i.e., a base address) for storing pixel data of the macroblock.

Step 2206: Arrange the pixel data of the macroblock according to the proposed data arrangement format.

Step 2208: Store the arranged pixel data of the macroblock in the DRAM based on a block-based scan order of the picture.

In a case where the first exemplary data arrangement design (FIG. 2-FIG. 4) is employed, for each pixel in the macroblock to be stored, step 2206 will judge if the current pixel (luma pixel or chroma pixel) is across a boundary of storage units. If the current pixel (luma pixel or chroma pixel) is not across a boundary of storage units, step 2206 prepares the pixel to be fully stored in one storage unit; and if the current pixel (luma pixel or chroma pixel) is across a boundary of storage units, step 2206 breaks the pixel into two parts that will be stored into two storage units respectively.

In a case where the second exemplary data arrangement design (FIG. 5) is employed, for each pixel in the macroblock to be stored, step 2206 will judge if the current pixel (luma pixel or chroma pixel) is across a boundary of storage units. If the current pixel (luma pixel or chroma pixel) is not across a boundary of storage units, step 2206 prepares the pixel to be fully stored in one storage unit; and if the current pixel (luma pixel or chroma pixel) is across a boundary of storage units, step 2206 breaks the pixel into two parts that will be stored into two storage units respectively. Besides, when P*N is not fully divisible by M, step 2206 further judges if the current pixel (luma pixel or chroma pixel) is the rightmost pixel in a lowermost pixel row of a current data block. If the current pixel (luma pixel or chroma pixel) is the rightmost pixel in a lowermost pixel row of the current data block, step 2206 prepares the next pixel (i.e., the leftmost pixel in an uppermost pixel row of a next data block) to be fully stored in another storage unit different from the current storage unit. If the current pixel (luma pixel or chroma pixel) is not the rightmost pixel in the lowermost pixel row of the current data block, step 2206 prepares at least a portion (i.e., part or all) of the next pixel (i.e., the leftmost pixel in the uppermost pixel row of the next data block) to be appended to an end of the current pixel in the current storage unit.

In a case where the third exemplary data arrangement design (FIGS. 7-8 or FIGS. 10-11) is employed, step 2206 separates each pixel in a compact unit into one MSB part and one LSB part, arranges LSB parts of pixels in the compact to be stored into one storage unit according to an LSB raster-scan order (or an LSB vertical scan order) defined in the block-based scan order of the picture IMG_IN, and arranges MSB parts of pixels in the compact unit to be stored into multiple storage units according to an MSB raster-scan order defined in the block-based scan order of the picture IMG_IN.

In a case where the fourth exemplary data arrangement design (FIG. 12-FIG. 14) is employed, step 2206 prepares P' (P'=int (M/N)) pixels to be fully stored in the same storage unit, and inserts (M−N*P') don't care bits at unused bit locations in the same storage unit.

In a case where the fifth exemplary data arrangement design (FIG. 15-FIG. 17) is employed, step 2206 prepares W1×H1 pixels in one basic block to be fully stored in a storage unit, and inserts (M−W1*H1*N) don't care bits at unused bit locations in the same storage unit.

Figure 23:
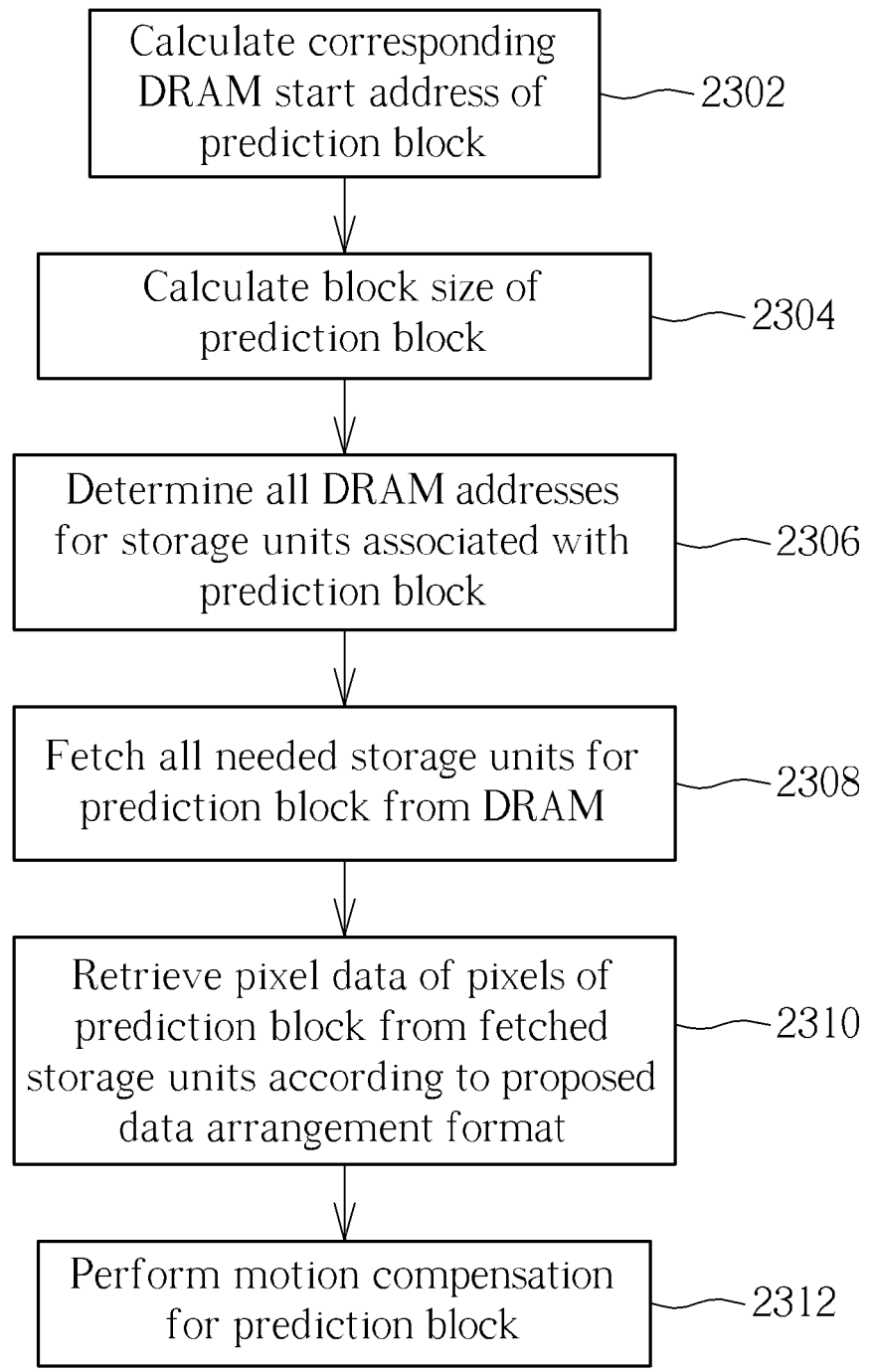
FIG. 23 is a flowchart illustrating a buffer read operation performed by the buffer controller according to an embodiment of the present invention.

FIG. 23 is a flowchart illustrating a buffer read operation performed by the buffer controller 104 according to an embodiment of the present invention. Provided that the result is substantially the same, the steps are not required to be executed in the exact order shown in FIG. 23. The buffer read operation may be applied to each prediction block needed by motion compensation. Since pixel data of the reference picture are stored in the DRAM based on a block-based scan order of the reference picture and have the proposed data arrangement, pixel data of the prediction block (which is composed of a plurality of partial pixel rows in the reference picture) should be read from adequate addresses of the DRAM. The buffer read operation applied to each prediction block of motion compensation may be briefly summarized as below.

Step 2302: Calculate a corresponding DRAM start address (i.e., a base address) for retrieving pixel data of the prediction block.

Step 2304: Calculate the block size of the prediction block.

Step 2306: Determine all DRAM addresses for storage units associated with the prediction block.

Step 2308: Fetch all needed storage units for the prediction block from the DRAM.

Step 2310: Retrieve pixel data of pixels of the prediction block from the fetched storage units according to the proposed data arrangement format.

Step 2312: Perform motion compensation for the prediction block.

In a case where the first exemplary data arrangement design (FIG. 2-FIG. 4) is employed, for each fetched storage unit obtained from the DRAM, step 2310 obtains pixel data of a plurality of pixels from the storage unit. Specifically, for each pixel in the fetched storage unit, step 2310 judges if the current pixel (luma pixel or chroma pixel) is across a boundary of storage units. If the current pixel (luma pixel or chroma pixel) is not across a boundary of storage units, step 2310 retrieves all pixel data of the pixel from the fetched storage unit; and if the current pixel (luma pixel or chroma pixel) is across a boundary of storage units, step 2310 retrieves a first portion of the pixel data of the pixel from the fetched storage unit, and combines the first portion of the pixel data of the pixel with a second portion of the pixel data of the pixel that is obtained from a different fetched storage unit.

In a case where the second exemplary data arrangement design (FIG. 5) is employed, for each fetched storage unit obtained from the DRAM, step 2310 obtains pixel data of a plurality of pixels from the storage unit. Specifically, for each pixel in the fetched storage unit, step 2310 judges if the current pixel (luma pixel or chroma pixel) is across a boundary of storage units. If the current pixel (luma pixel or chroma pixel) is not across a boundary of storage units, step 2310 retrieves all pixel data of the pixel from the fetched storage unit; and if the current pixel (luma pixel or chroma pixel) is across a boundary of storage units, step 2310 retrieves a first portion of the pixel data of the pixel from the fetched storage unit, and combines the first portion of the pixel data of the pixel with a second portion of the pixel data of the pixel that is obtained from a different fetched storage unit. Besides, when P*N is not fully divisible by M, step 2310 further judges if the current pixel (luma pixel or chroma pixel) is the rightmost pixel in a lowermost pixel row of a current data block. If the current pixel (luma pixel or chroma pixel) is the rightmost pixel in the lowermost pixel row of the current data block, step 2310 discards empty bits (i.e., don't care bits) in unused bit locations of the fetched storage unit, and obtains pixel data of the next pixel (i.e., the leftmost pixel of an uppermost pixel row of a next data block) from a different fetched storage unit. If the current pixel (luma pixel or chroma pixel) is not the rightmost pixel in the lowermost pixel row of the current data block, step 2310 obtains at least a portion (i.e., part or all) of the next pixel (i.e., the leftmost pixel of an uppermost pixel row of a next data block) after an end of the current pixel in the fetched storage unit.

In a case where the third exemplary data arrangement design (FIGS. 7-8 or FIGS. 10-11) is employed, step 2310 obtains LSB parts of all pixels in a compact unit from one storage unit, obtains MSB parts of all pixels in the compact unit from other successive storage units, and combines an LSB part and an MSB part of each pixel to obtain pixel data of the pixel in the compact unit.

In a case where the fourth exemplary data arrangement design (FIG. 12-FIG. 14) is employed, step 2310 obtains pixel data of P' (P'=int (M/N)) pixels in a fetched storage unit, and discards (M−N*P') empty bits (e.g., don't care bits) in unused bit locations in the same storage unit.

In a case where the fifth exemplary data arrangement design (FIG. 15-FIG. 17) is employed, step 2310 obtains pixel data of W1×H1 pixels of one basic block from one fetched storage unit, and discards (M−N*W1*H1) empty bits (e.g., don't care bits) in unused bit locations in the same storage unit.

Please note that the flows shown in FIG. 22 and FIG. 23 are for illustrative purposes only, and are not meant to be limitations of the present invention. That is, no matter how the pixel data of the picture are written into and read from the buffer device, any buffer device using the proposed data arrangement to store the pixel data of the picture falls within the scope of the present invention.

In above examples shown in FIG. 18-FIG. 21, one M-bit storage unit is evenly divided into a plurality of grid units each having at least one luma pixel and at least one chroma pixel stored therein. In an alternative design, one M-bit storage unit may be evenly divided into a plurality of G-bit grid units, and each of the G-bit grid units is addressed by a single address and has only one N-bit pixel (e.g., an N-bit luma pixel or an N-bit chroma pixel) stored therein. In other words, each N-bit pixel may be regarded as a G-bit pixel stored in an M-bit storage unit, where (G−N) bits in the G-bit pixel are empty bits (i.e., don't care bits). In one embodiment, these (G−N) bits are located at the end of each grid unit.

Figure 24:
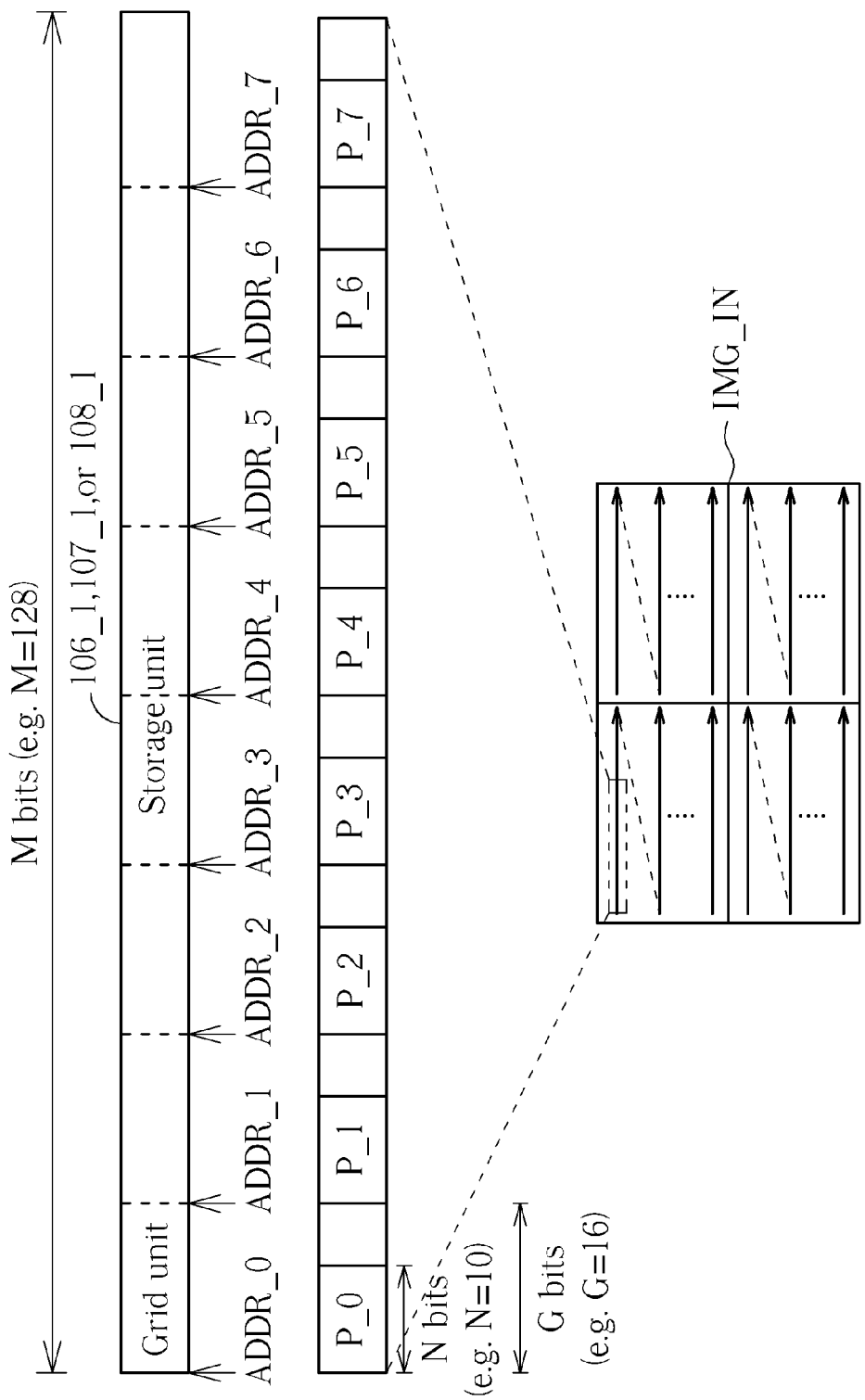
FIG. 24 is a diagram illustrating a data arrangement of pixels in grid units each addressed by a single address according to the seventh exemplary data arrangement design of the present invention.

Please refer to FIG. 24, which is a diagram illustrating a data arrangement of pixels in grid units each addressed by a single address according to a seventh exemplary data arrangement design of the present invention, where each used M-bit storage unit stores an integer number of N-bit pixels without any fractional N-bit pixel, and each grid unit stores only one N-bit pixel. As shown in FIG. 24, one M-bit storage unit is evenly divided into a plurality of G-bit grid units each used for storing only one N-bit pixel. In this embodiment, M=128, G=16 and N=10. Therefore, the number of grid units in one storage unit is 8, and the grid units are addressed by memory addresses ADDR_0-ADDR_7, respectively.

Consider a case where luma pixels are stored in one buffer, and chroma pixels of different chrominance components (Cr, Cb) are stored in another buffer according to an interleaved manner. Hence, the buffer device 101 is configured to have buffers 102_1 and 102_2. When the storage unit shown in FIG. 24 is one storage unit (e.g., 106_1) of the buffer 102_1, the pixels P_0-P_7 obtained from the picture IMG_IN are luma pixels, and stored in the grid units of the storage unit 106_1 according to a block-based scan order (which includes a raster-scan order of data blocks in the picture IMG_IN, and a raster-scan order for pixels in each data block). When the storage unit shown in FIG. 24 is one storage unit (e.g., 107_1) of the buffer 102_2, the pixels P_0, P_2, P_4, P_6 obtained from the picture IMG_IN are chroma pixels of one chrominance component (e.g., Cb), and stored in the grid units of the storage unit 106_1 according to the block-based scan order; and the pixels P_1, P_3, P_5, P_7 obtained from the picture IMG_IN are chroma pixels of another chrominance component (e.g., Cr), and stored in the grid units of the storage unit 106_1 according to the block-based scan order.

Consider another case where luma pixels are stored in one buffer, chroma pixels of one chrominance component (e.g., Cb) are stored in another buffer, and chroma pixels of another chrominance component (e.g., Cr) are stored in yet another buffer. Hence, the buffer device 101 is configured to have buffers 102_1, 102_2 and 102_3. When the storage unit shown in FIG. 24 is one storage unit (e.g., 106_1) of the buffer 102_1, the pixels P_0-P_7 obtained from the picture IMG_IN are luma pixels, and stored in the grid units of the storage unit 106_1 according to a block-based scan order (which includes a raster-scan order of data blocks in the picture IMG_IN, and a raster-scan order for pixels in each data block). When the storage unit shown in FIG. 24 is one storage unit (e.g., 107_1) of the buffer 102_2, the pixels P_0-P_7 obtained from the picture IMG_IN are chroma pixels of one chrominance component Cb, and stored in the grid units of the storage unit 107_1 according to the block-based scan order. When the storage unit shown in FIG. 24 is one storage unit (e.g., 108_1) of the buffer 102_3, the pixels P_0-P_7 obtained from the picture IMG_IN are chroma pixels of another chrominance component Cr, and stored in the grid units of the storage unit 108_1 according to the block-based scan order.

The data arrangement shown in FIG. 24 is very easy to implement, and requires lower design efforts. This is because that the size of each grid unit for storing only one N-bit pixel (N is not a power-of-two value, i.e., N≠$2^n$) may be designed to be an integer multiple of the size of a conventional 8-bit pixel (8 is a power-of-two value, i.e., 8=$2^3$). For example, one 16-bit grid unit is capable of storing two conventional 8-bit pixels. Hence, with a slight modification made to the address generation scheme of the conventional buffer controller, a modified buffer controller can be easily obtained to realize the buffer controller 104 shown in FIG. 1.

Figure 25:
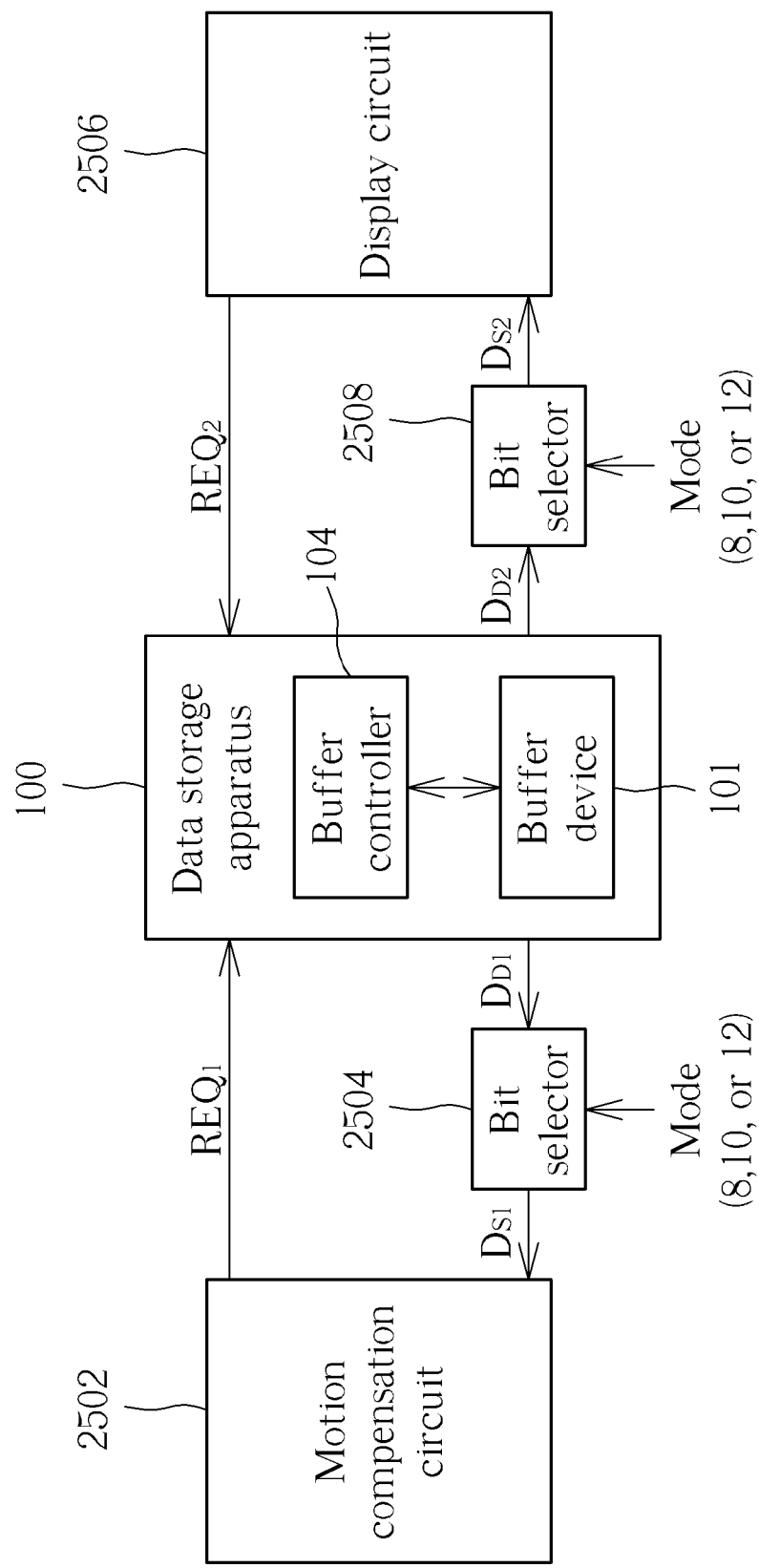
FIG. 25 is a block diagram illustrating an application using a data storage apparatus supporting a unified addressing mode according to an embodiment of the present invention.

In a preferred embodiment, the buffer controller 104 may be configured to support different pixel depths (e.g., 8 bits, 10 bits, and 12 bits) under a unified addressing mode, and each grid unit may be used to store a single pixel with one of the supported pixel depths, depending upon the application requirement. Please refer to FIG. 25, which is a block diagram illustrating an application using a data storage apparatus supporting a unified addressing mode according to an embodiment of the present invention. The data storage apparatus 100 in FIG. 25 is configured to employ the data arrangement scheme shown in FIG. 24 for storing only one N-bit pixel in each G-bit grid unit of the M-bit storage unit, where N may be 8, 10 or 12 based on the application requirement. The motion compensation circuit 2502 generates a DRAM request $REQ_1$ via 16-bit based address generation for reading one grid unit from the buffer device 101. Hence, the buffer controller 104 outputs one 16-bit DRAM data $D_{D1}$ in response to the request $REQ_1$. The bit selector 2504 receives a mode control signal which indicates which of the supported pixel depths is actually used in the motion compensation circuit 2502, and selects/extracts at least a portion (i.e., part or all) of bits from the 16-bit DRAM data $D_{D1}$ to generate selected data $D_{S1}$ to the motion compensation circuit 2502.

Similarly, the display circuit 2506 generates a DRAM request $REQ_2$ via 16-bit based address generation for reading one grid unit from the buffer device 101. Hence, the buffer controller 104 outputs one 16-bit DRAM data $D_{D2}$ in response to the request $REQ_2$. The bit selector 2508 receives a mode control signal which indicates which of the supported pixel depths is actually used in the display circuit 2506, and selects/extracts at least a portion (i.e., part or all) of bits from the 16-bit DRAM data $D_{D2}$ to generate selected data $D_{S2}$ to the display circuit 2506.

Figure 26:
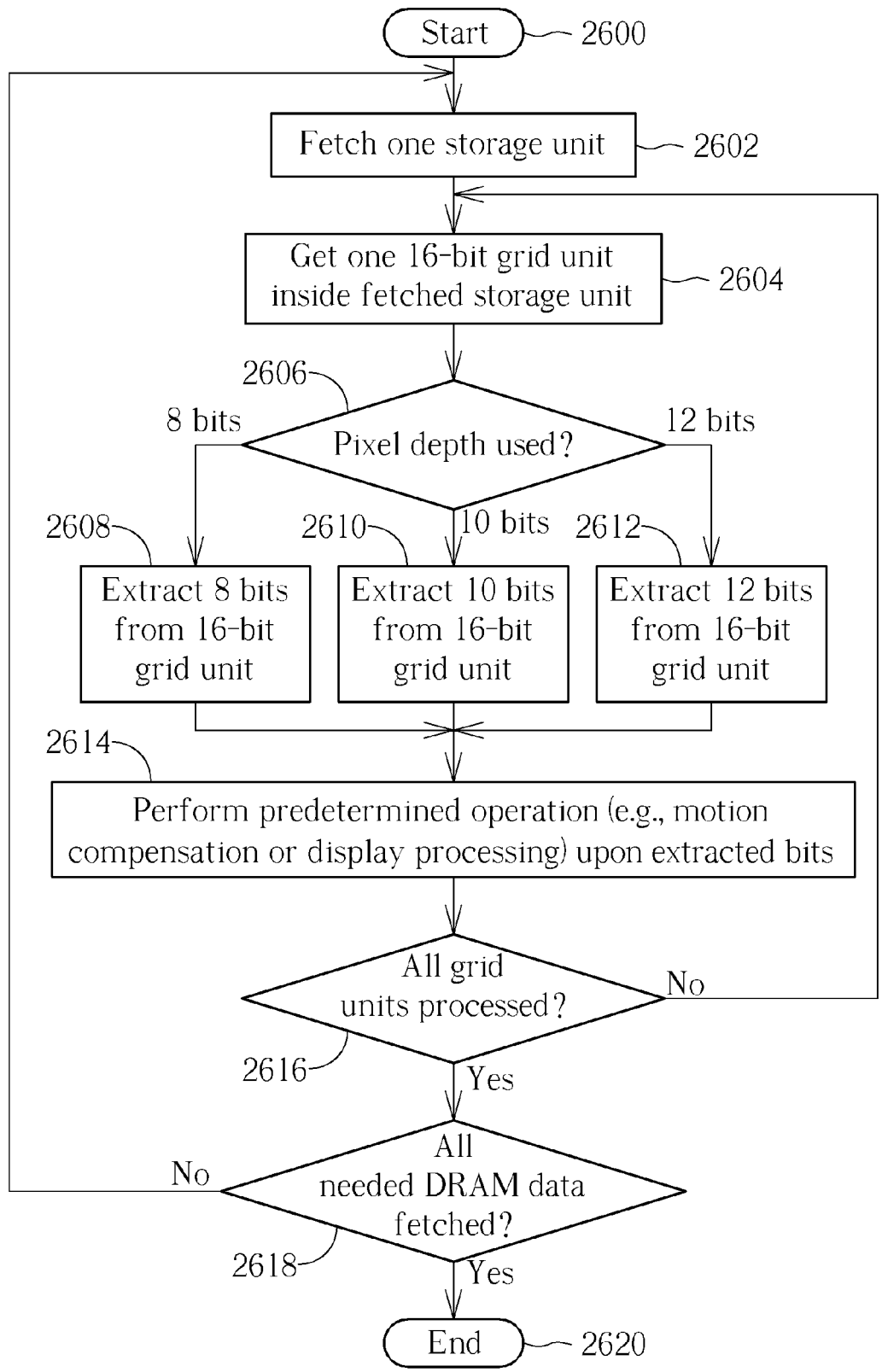
FIG. 26 is a flowchart illustrating a data fetch operation under a 16-bit based addressing mode according to an embodiment of the present invention.

FIG. 26 is a flowchart illustrating a data fetch operation under a 16-bit based addressing mode according to an embodiment of the present invention. Provided that the result is substantially the same, the steps are not required to be executed in the exact order shown in FIG. 26. The data fetch operation under a 16-bit based addressing mode may be briefly summarized as below.

Step 2600: Start.

Step 2602: Fetch one storage unit.

Step 2604: Get one 16-bit grid unit inside the fetched storage unit.

Step 2606: Check a pixel depth used by a video processing circuit which requests the DRAM data. If the pixel depth is 8 bits, go to step 2608; if the pixel depth is 10 bits, go to step 2610; and if the pixel depth is 12 bits, go to step 2612.

Step 2608: Extract 8 bits from the 16-bit grid unit. Go to step 2614.

Step 2610: Extract 10 bits from the 16-bit grid unit. Go to step 2614.

Step 2612: Extract 12 bits from the 16-bit grid unit.

Step 2614: Perform a predetermined operation (e.g., motion compensation or display processing) upon the extracted bits.

Step 2616: Check if all grid units inside the fetched storage unit have been processed. If yes, go to step 2618; otherwise, go to step 2604 to get the next 16-bit grid unit inside the fetched storage unit.

Step 2618: Check if all needed DRAM data have been fetched. If yes, go to step 2620; otherwise, go to step 2602 to fetch the next storage unit.

Step 2620: End.

As a person skilled in the art can readily understand details of each step in FIG. 26 after reading above paragraphs directed to FIG. 24 and FIG. 25, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data arrangement method, comprising:
    obtaining pixel data of a plurality of first N-bit pixels of a picture; and
    storing, by a buffer controller, the obtained pixel data of the first N-bit pixels in a plurality of M-bit storage units of a first buffer according to a block-based scan order of the picture, wherein the first buffer is a memory, each of the M-bit storage units is one memory word of the memory, the picture includes a plurality of data blocks, the block-based scan order includes a raster-scan order for the data blocks, at least one of the M-bit storage units is filled with part of the obtained pixel data of the first N-bit pixels, M and N are positive integers, M is larger than N, M is not divisible by N, M is a power-of-two value, N is not a power-of-two value, and the first N-bit pixels include at least one pixel divided into a first part stored in one of the M-bit storage units in the first buffer and a second part stored in another of the M-bit storage units in the first buffer;

wherein the first N-bit pixels correspond to one of luma pixels and chroma pixels of the picture.

2. The data arrangement method of claim 1, wherein the storing step comprises:

based on the block-based scan order, continuously storing the obtained pixel data of the first N-bit pixels in the M-bit storage units of the first buffer one by one, until all of the obtained pixel data are stored in the first buffer.

3. The data arrangement method of claim 1, wherein the block-based scan order further includes a raster-scan order for first N-bit pixels in each data block; and the at least one pixel is not a leftmost first N-bit pixel in an uppermost pixel row of each data block.

4. The data arrangement method of claim 3, wherein the storing step comprises:

after storing pixel data of a rightmost first N-bit pixel in a lowermost pixel row of a current data block into a first M-bit storage unit of the first buffer, storing pixel data of a leftmost first N-bit pixel in an uppermost pixel row of a next data block into a second M-bit storage unit of the first buffer no matter whether the first M-bit storage unit has unused bit(s).

5. The data arrangement method of claim 1, wherein each of the first N-bit pixels in the picture is divided into the first part and the second part stored in different M-bit storage units of the first buffer respectively.

6. The data arrangement method of claim 5, wherein the first part has N1 bits, the second part has N2 bits, and M is divisible by each of N1 and N2.

7. The data arrangement method of claim 6, wherein the block-based scan order further includes a vertical scan order for a plurality of compact units vertically arranged in each data block; and the M-bit storage units of the first buffer comprise a plurality of first M-bit storage units and a second M-bit storage unit for storing pixel data of each compact unit, where the first M-bit storage units are filled with first parts of first N-bit pixels in the compact unit, and the second M-bit storage unit is filled with second parts of first N-bit pixels in the compact unit.

8. The data arrangement method of claim 7, wherein the block-based scan order further includes a raster-scan order for first parts of first N-bit pixels in each compact unit.

9. The data arrangement method of claim 7, wherein the block-based scan order further includes a raster-scan order for second parts of first N-bit pixels in each compact unit.

10. The data arrangement method of claim 7, wherein the block-based scan order further includes a vertical scan order for second parts of first N-bit pixels in each compact unit.

11. The data arrangement method of claim 1, wherein the first N-bit pixels are the luma pixels of the picture.

12. The data arrangement method of claim 1, wherein the first N-bit pixels are the chroma pixels of different chrominance components of the picture.

13. The data arrangement method of claim 12, wherein chroma pixels of a first chrominance component of the picture and chroma pixels of a second chrominance component of the picture are stored in an interleaved arrangement.

14. The data arrangement method of claim 1, further comprising:

obtaining pixel data of a plurality of second N-bit pixels of the picture; and storing the obtained pixel data of the second pixels in a plurality of M-bit storage units of a second buffer based on the block-based scan order of the picture;

wherein the first N-bit pixels are chroma pixels of a first chrominance component of the picture, the second N-bit pixels are chroma pixels of a second chrominance component of the picture, and the second N-bit pixels include at least one pixel divided into a first part stored in one of the M-bit storage units in the second buffer and a second part stored in another of the M-bit storage units in the second buffer.

15. The data arrangement method of claim 1, wherein the picture has a 4:4:4 color format, a 4:2:2 color format, or a 4:2:0 color format.

16. A data arrangement method, comprising:

obtaining pixel data of a plurality of first N-bit pixels of a picture; and storing, by a buffer controller, at least the obtained pixel data of the first N-bit pixels in a plurality of M-bit storage units of a first buffer based on a block-based order of the picture, wherein the picture includes a plurality of data blocks, the block-based scan order includes a raster-scan order for the data blocks, each of the M-bit storage units of the first buffer stores an integer number of first N-bit pixels, each of the first N-bit pixels is not divided into multiple parts stored in different M-bit storage units of the M-bit storage units, respectively, at least one first N-bit pixel is fully stored in said each of the M-bit storage units, M and N are positive integers, M is larger than N, M is not divisible by N, M is a power-of-two value, and N is not a power-of-two value;

wherein the first N-bit pixels correspond to one of luma pixels and chroma pixels of the picture.

17. The data arrangement method of claim 16, wherein the storing step comprises:

continuously storing pixel data of first N-bit pixels into one M-bit storage unit of the first buffer, until the M-bit storage unit does not have enough unused bits for fully storing one more first N-bit pixel.

18. The data arrangement method of claim 16, wherein the block-based scan order further includes a raster-scan order for first N-bit pixels in each data block.

19. The data arrangement method of claim 16, wherein the block-based scan order further includes a raster-scan order for basic blocks in each data block, and each of the M-bit storage units of the first buffer stores first N-bit pixels of one basic block only.

20. The data arrangement method of claim 16, wherein the first N-bit pixels are the luma pixels of the picture.

21. The data arrangement method of claim 16, wherein the first N-bit pixels are the chroma pixels of different chrominance components of the picture.

22. The data arrangement method of claim 21, wherein chroma pixels of a first chrominance component of the picture and chroma pixels of a second chrominance component of the picture are stored in an interleaved arrangement.

23. The data arrangement method of claim 16, further comprising:

obtaining pixel data of a plurality of second N-bit pixels of the picture; and storing the obtained pixel data of the second pixels in a plurality of M-bit storage units of a second buffer based on the block-based scan order of the picture;

wherein each of the M-bit storage units of the second buffer stores an integer number of second N-bit pixels without any fractional second N-bit pixel, the first N-bit pixels are chroma pixels of a first chrominance component of the picture, and the second N-bit pixels are chroma pixels of a second chrominance component of the picture.

24. The data arrangement method of claim 16, wherein each of the M-bit storage units of the first buffer is evenly divided into a plurality of grid units; and each of the grid units is addressed by a single address, and has only one first N-bit pixel stored therein.

25. The data arrangement method of claim 16, wherein the picture has a 4:4:4 color format, a 4:2:2 color format, or a 4:2:0 color format.

26. The data arrangement method of claim 16, wherein the first buffer is a memory, and each of the M-bit storage units is one word of the memory.

27. A data arrangement method, comprising:
obtaining pixel data of a plurality of first N-bit pixels of a picture;
obtaining pixel data of a plurality of second N-bit pixels of the picture; and
storing, by a buffer controller, the obtained pixel data of the first N-bit pixels and the obtained pixel data of the second N-bit pixels in a plurality of M-bit storage units of a buffer based on a block-based scan order of the picture;
wherein each of the M-bit storage units of the buffer stores an integer number of first N-bit pixels, and further stores an integer number of second N-bit pixels; each of the first N-bit pixels is not divided into multiple parts stored in different M-bit storage units of the M-bit storage units, respectively; each of the second N-bit pixels is not divided into multiple parts stored in different M-bit storage units of the M-bit storage units, respectively; M and N are positive integers; M is larger than N; M is not divisible by N; M is a power-of-two value, and N is not a power-of-two value; the first N-bit pixels are luma pixels; the second N-bit pixels are chroma pixels; and at least one first N-bit pixel and at least one second N-bit pixel are fully stored in said each of the M-bit storage units.

28. The data arrangement method of claim 27, wherein each of the M-bit storage units of the first buffer is evenly divided into a plurality of grid units each having at least one first N-bit pixel and at least one second N-bit pixel stored therein.

29. A data storage apparatus, comprising:
a buffer, having a plurality of M-bit storage units, wherein the buffer is a memory, and each of the M-bit storage units is one memory word of the memory; and
a buffer controller, arranged to obtain pixel data of a plurality of N-bit pixels of a picture, and store the obtained pixel data of the N-bit pixels in the M-bit storage units of the buffer based on a block-based scan order of the picture;

wherein the picture includes a plurality of data blocks, the block-based scan order includes a raster-scan order for the data blocks, at least one of the M-bit storage units is filled with part of the obtained pixel data of the N-bit pixels, M and N are positive integers, M is larger than N, M is not divisible by N, M is a power-of-two value, N is not a power-of-two value, and the N-bit pixels include at least one pixel divided into a first part stored in one of the M-bit storage units in the buffer and a second part stored in another of the M-bit storage units in the buffer; and wherein the N-bit pixels correspond to one of luma pixels and chroma pixels of the picture.

30. A data storage apparatus, comprising:
a buffer, having a plurality of M-bit storage units; and
a buffer controller, arranged to obtain pixel data of a plurality of N-bit pixels of a picture, and store at least the obtained pixel data of the N-bit pixels into the M-bit storage units of the buffer based on a block-based scan order of the picture;
wherein the picture includes a plurality of data blocks, the block-based scan order includes a raster-scan order for the data blocks, each of the M-bit storage units of the buffer stores an integer number of N-bit pixels, each of the first N-bit pixels is not divided into multiple parts stored in different M-bit storage units of the M-bit storage units, respectively, at least one N-bit pixel is fully stored in said each of the M-bit storage units, M and N are positive integers, M is larger than N, M is not divisible by N, M is a power-of-two value, and N is not a power-of-two value; and
wherein the N-bit pixels correspond to one of luma pixels and chroma pixels of the picture.

31. A data storage apparatus, comprising:
a buffer, having a plurality of M-bit storage units; and
a buffer controller, arranged to obtain pixel data of a plurality of first N-bit pixels of a picture; obtain pixel data of a plurality of second N-bit pixels of the picture; and store the obtained pixel data of the first N-bit pixels and the obtained pixel data of the second N-bit pixels in a plurality of M-bit storage units of a buffer based on a block-based scan order of the picture;
wherein each of the M-bit storage units of the buffer stores an integer number of first N-bit pixels, and further stores an integer number of second N-bit pixels; each of the first N-bit pixels is not divided into multiple parts stored in different M-bit storage units of the M-bit storage units, respectively; each of the second N-bit pixels is not divided into multiple parts stored in different M-bit storage units of the M-bit storage units, respectively; M and N are positive integers; M is larger than N; M is not divisible by N; M is a power-of-two value, and N is not a power-of-two value; the first N-bit pixels are luma pixels; the second N-bit pixels are chroma pixels; and at least one first N-bit pixel and at least one second N-bit pixel are fully stored in said each of the M-bit storage units.

* * * * *